US011372757B2

(12) United States Patent
Magill et al.

(10) Patent No.: US 11,372,757 B2
(45) Date of Patent: Jun. 28, 2022

(54) TRACKING REPEATED READS TO GUIDE DYNAMIC SELECTION OF CACHE COHERENCE PROTOCOLS IN PROCESSOR-BASED DEVICES

(71) Applicant: Microsoft Technology Licensing, LLC, Redmond, WA (US)

(72) Inventors: Kevin Neal Magill, Durham, NC (US); Eric Francis Robinson, Raleigh, NC (US); Derek Bachand, Raleigh, NC (US); Jason Panavich, Raleigh, NC (US); Michael B. Mitchell, Fuquay-Varina, NC (US); Michael P. Wilson, Fuquay-Varina, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/012,211

(22) Filed: Sep. 4, 2020

(65) Prior Publication Data
US 2022/0075726 A1    Mar. 10, 2022

(51) Int. Cl.
*G06F 12/0815*    (2016.01)
*G06F 12/0806*    (2016.01)

(52) U.S. Cl.
CPC .... *G06F 12/0806* (2013.01); *G06F 2212/621* (2013.01)

(58) Field of Classification Search
CPC ....... G06F 2212/621; G06F 2212/1016; G06F 12/0831; G06F 3/0659; G06F 12/0806;
(Continued)

(56) References Cited

U.S. PATENT DOCUMENTS 5,835,950 A    11/1998    Cho et al.
6,829,665 B2    12/2004    Jones et al.
(Continued)

FOREIGN PATENT DOCUMENTS

EP    0825538 A1    2/1998

OTHER PUBLICATIONS

"Application Filed in U.S. Appl. No. 16/736,865", filed Jan. 8, 2020, 45 Pages.
(Continued)

*Primary Examiner* — Hashem Farrokh
(74) *Attorney, Agent, or Firm* — Withrow & Terranova, PLLC

(57) ABSTRACT

Tracking repeated reads to guide dynamic selection of cache coherence protocols in processor-based devices is disclosed. In this regard, a processor-based device includes processing elements (PEs) and a central ordering point circuit (COP). The COP dynamically selects, on a store-by-store basis, either a write invalidate protocol or a write update protocol as a cache coherence protocol to use for maintaining cache coherency for a memory store operation. The COP's selection is based on protocol preference indicators generated by the PEs using repeat-read indicators that each PE maintains to track whether a coherence granule was repeatedly read by the PE (e.g., as a result of polling reads, or as a result of re-reading the coherence granule after it was evicted from a cache due to an invalidating snoop). After selecting the cache coherence protocol, the COP sends a response message to the PEs indicating the selected cache coherence protocol.

24 Claims, 16 Drawing Sheets

(58) Field of Classification Search
CPC .. G06F 12/0891; G06F 3/0604; G06F 3/0685; G06F 9/30043; G06F 12/0842; G06F 2212/283
USPC .......................................................... 711/141
See application file for complete search history.

(56) References Cited

U.S. PATENT DOCUMENTS

| | | | |
|---|---|---|---|
| 7,802,058 | B1 | 9/2010 | Miller et al. |
| 8,776,063 | B2 | 7/2014 | Dice et al. |
| 2005/0120182 | A1 | 6/2005 | Koster et al. |
| 2007/0101068 | A1 | 5/2007 | Anand et al. |
| 2016/0378659 | A1* | 12/2016 | Gschwind ............ G06F 9/30043 711/135 |
| 2017/0177482 | A1 | 6/2017 | Greenspan |
| 2018/0089084 | A1 | 3/2018 | Le et al. |
| 2018/0165199 | A1 | 6/2018 | Brandt et al. |
| 2019/0087333 | A1* | 3/2019 | Robinson ............ G06F 12/0831 |
| 2021/0209026 | A1* | 7/2021 | Magill ................. G06F 3/0659 |

OTHER PUBLICATIONS

Chapman, Matthew, "vNUMA: Virtual Shared-Memory Multiprocessors", In Thesis of the University of New South Wales, 2008, 209 Pages.

Giorgi, et al., "PSCR: A Coherence Protocol for Eliminating Passive Sharing in Shared-Bus Shared-Memory Multiprocessors", In Journal of IEEE Transactions on Parallel and Distributed Systems, vol. 10, Issue 7, Jul. 1999, pp. 742-763.

Kayi, et al., "Adaptive Cache Coherence Mechanisms with Producer—Consumer Sharing Optimization for Chip Multiprocessors", In Journal of IEEE Transactions on Computers, vol. 64, Issue 2, Feb. 2015, pp. 316-328.

Ivosevic, et al., "Time Domain Performance Evaluation of Adaptive Hybrid Cache Coherence Protocols", In Proceedings of the 10th Mediterranean Electrotechnical Conference, vol. 1, May 29, 2000, pp. 41-44.

"International Search Report and Written Opinion Issued in PCT Application No. PCT/US20/061893", dated Mar. 15, 2021, 13 Pages.

West, et al., "Core Monitors: Monitoring Performance in Multicore Processors", In Proceedings of the 6th ACM Conference on Computing Frontiers, May 18, 2009, pp. 31-39.

Quayle Action for U.S. Appl. No. 16/736,865, dated Feb. 4, 2021, 5 pages.

Notice of Allowance for U.S. Appl. No. 16/736,865, dated May 28, 2021, 8 pages.

"International Search Report and Written Opinion Issued in PCT Application No. PCT/US21/034696", dated Sep. 15, 2021, 10 Pages.

Yamanouchi, Nagatsugu, "Performance effects of program structures on a snoop-cached multiprocessor system", In the Journal of Future Generation Computer Systems vol. 7, Issue 2-3, Apr. 1, 1992, pp. 247-258.

\* cited by examiner

TRACKING REPEATED READS TO GUIDE DYNAMIC SELECTION OF CACHE COHERENCE PROTOCOLS IN PROCESSOR-BASED DEVICES

FIELD OF THE DISCLOSURE

The technology of the disclosure relates to cache coherence protocols in processor-based devices, and, more particularly, to dynamic selection of cache coherence protocols.

BACKGROUND

A processor-based device may include multiple processing elements (PEs) (e.g., processor cores, as a non-limiting example) that each provide one or more local caches for storing frequently accessed data. Because the multiple PEs of the processor-based device may share a memory resource such as a system memory, multiple copies of shared data read from a given memory address may exist at the same time within the system memory and within the local caches of the PEs. Thus, to ensure that all of the PEs have a consistent view of the shared data, the processor-based device provides support for a cache coherence protocol to enable local changes to the shared data within one PE to be propagated to other PEs. In this manner, conflicts that may arise between the PEs due to inconsistencies between local copies of the shared data can be avoided.

Conventional cache coherence protocols include write invalidate protocols and write update protocols. Under a write invalidate protocol, when one PE writes to a coherence granule (a subdivision of the system memory representing an aligned size in bytes on which cache coherence is managed), all copies of the coherence granule stored in the local caches of the other PEs are invalidated, with dirty (i.e., modified) copies of the coherence granule being written to the system memory before being invalidated. A PE that loses a cached copy of the coherence granule in this manner may subsequently re-obtain a copy of the coherence granule via a memory load operation after the memory store operation that triggered the invalidation is completed. In contrast, under a write update protocol, when one PE writes new data to the coherence granule, all other PEs receive a copy of the new data, and update their respective local copies of the coherence granule using the new data. Consequently, the write update protocol does not require invalidation of any local cached copies of the coherence granule, and thus no additional memory load operations are needed to re-obtain a lost coherence granule.

The relative efficiency of the write invalidate protocol and the write update protocol may depend on the circumstances under which each PE is operating. In general, the write invalidate protocol is more efficient than the write update protocol in scenarios where many subsequent memory store operations to the same coherence granule are performed by a PE, and where the updated coherence granule is unlikely to be read by another PE in the near term. For example, when a software thread migrates from a first PE to a second PE, it is more efficient for a memory store operation from the second PE to invalidate a local cached copy of the coherence granule in the first PE than it would be to update the value of the local cached copy of the coherence granule in the first PE. The write update protocol, though, is more efficient than the write invalidate protocol when a memory store operation to a coherence granule is followed by memory load operations on the same coherence granule by multiple PEs. In this scenario, the write update protocol ensures that all PEs holding a local cached copy of the coherence granule receive an updated copy, whereas the write invalidate protocol in the same scenario would require PEs holding local cached copies of the coherence granule to invalidate their now-stale copies, and then perform memory load operations by sending individual read bus commands to a central ordering point circuit (COP) to read the updated value.

Thus, while the write invalidate protocol and the write update protocol each have advantages in particular circumstances, neither is equally efficient in all scenarios. Moreover, information useful in determining which cache coherence protocol would be most efficient in a given scenario may not be accessible by a single entity such as the COP, but rather may be distributed among one or more of the master PE, the snooper PEs, and the COP. Accordingly, it is desirable to provide a mechanism by which an appropriate cache coherence protocol may be used according to existing circumstances at the time a memory store operation is performed.

SUMMARY

Exemplary embodiments disclosed herein include tracking repeated reads to guide dynamic selection of cache coherence protocols in processor-based devices. In this regard, in one exemplary embodiment, a processor-based device comprises a central ordering point circuit (COP) and a plurality of processing elements (PEs), with each PE providing a plurality of repeat-read indicators that correspond to coherence granules read by the PE. The repeat-read indicators are used by the PE to track whether a coherence granule was repeatedly read by the PE (e.g., as a result of re-reading the coherence granule due to polling, or as a result of re-reading the coherence granule after it was evicted from a cache due to an invalidating snoop). The plurality of PEs includes a master PE and at least one snooper PE. As used herein, the term "master PE" refers to a PE that performs a memory store operation, and that sends cache coherence bus commands to the COP. The term "snooper PE" refers to a PE that receives snoop commands associated with the memory store operation from the COP, and then acts on the snoop commands to maintain cache coherence. Accordingly, a PE may operate as a master PE with respect to one memory store operation, and may also operate as a snooper PE with respect to a different memory store operation.

One of the most accurate indicators of whether the write update protocol is more advantageous than the write invalidate protocol is whether a snooper PE holding a cached copy of the coherence granule being written by the cache coherence bus command has repeatedly performed read operations to that coherence granule in the past. Accordingly, after a master PE of the plurality of PEs sends a cache coherence bus command to the COP as part of a memory store operation, a PE of the plurality of PEs (e.g., the master PE or a snooper PE) uses its repeat-read indicators to generate a first protocol preference indicator to indicate whether that PE predicts that a write invalidate protocol or a write update protocol is preferred (based on a likelihood of subsequently re-reading the coherence granule as indicated by the corresponding repeat-read indicator). The PE then sends the first protocol preference indicator to the COP. Using protocol preference indicators (including the first protocol preference indicator) provided by the master PE, the snooper PE, and the COP, the COP dynamically selects, on a store-by-store basis, either the write invalidate protocol or the write update protocol as the cache coherence protocol to use for maintaining cache coherency for a memory store operation by the master PE. After selecting the cache coherence protocol to use based on the protocol preference indicators, the COP sends a response message, indicating the selected cache coherence protocol for the memory store operation, to each of the master PE and the at least one snooper PE.

In another exemplary embodiment, a method for tracking repeated reads to guide dynamic selection of cache coherence protocols in processor-based devices is provided. The method comprises sending, by a master PE of a plurality of PEs of a processor-based device, a cache coherence bus command to a COP as part of a memory store operation. The method further comprises generating, by a PE of the plurality of PEs, a first protocol preference indicator based on a repeat-read indicator of a plurality of repeat-read indicators of the PE, each repeat-read indicator of the plurality of repeat-read indicators corresponding to a coherence granule read by the PE and indicating whether the coherence granule was repeatedly read by the PE. The method also comprises sending the first protocol preference indicator to the COP. The method additionally comprises, responsive to receiving the cache coherence bus command, dynamically selecting, by the COP on a store-by-store basis, one of a write invalidate protocol and a write update protocol as a cache coherence protocol to use for maintaining cache coherency, based on one or more protocol preference indicators provided by one or more of the master PE, at least one snooper PE among the plurality of PEs, and the COP, the one or more protocol preference indicators comprising the first protocol preference indicator. The method further comprises sending, by the COP, a response message indicating the selected cache coherence protocol to each of the master PE and the at least one snooper PE.

In another exemplary embodiment, a non-transitory computer-readable medium having stored thereon computer-executable instructions is provided. The computer-executable instructions, when executed by a processor-based device, cause the processor-based device to send, by a master PE of a plurality of PEs of a processor-based device, a cache coherence bus command to the COP as part of a memory store operation. The computer-executable instructions further cause the processor-based device to generate, by a PE of the plurality of PEs, a first protocol preference indicator based on a repeat-read indicator of a plurality of repeat-read indicators of the PE, each repeat-read indicator of the plurality of repeat-read indicators corresponding to a coherence granule read by the PE and indicating whether the coherence granule was repeatedly read by the PE. The computer-executable instructions also cause the processor-based device to send the first protocol preference indicator to COP of the processor-based device. The computer-executable instructions additionally cause the processor-based device to, responsive to receiving the cache coherence bus command, dynamically select, by the COP on a store-by-store basis, one of a write invalidate protocol and a write update protocol as a cache coherence protocol to use for maintaining cache coherency, based on one or more protocol preference indicators provided by one or more of the master PE, at least one snooper PE among the plurality of PEs, and the COP, the one or more protocol preference indicators comprising the first protocol preference indicator. The computer-executable instructions further cause the processor-based device to send, by the COP, a response message indicating the selected cache coherence protocol to each of the master PE and the at least one snooper PE.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

Figure 1:
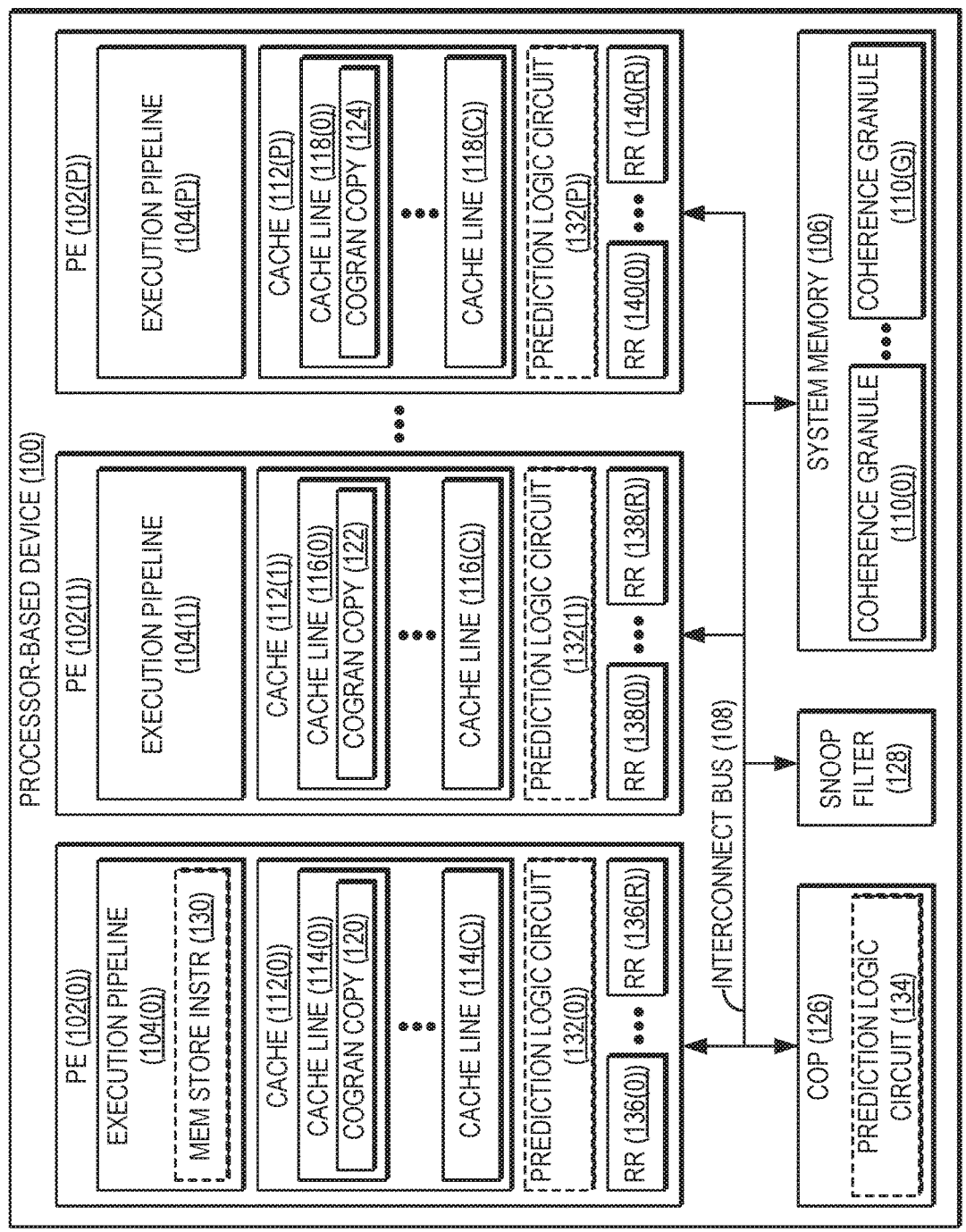
FIG. 1 is a block diagram illustrating an exemplary processor-based device configured to track repeated reads to guide dynamic selection of cache coherence protocols in processor-based devices using protocol preference indicators that are generated based on repeat-read indicators, according to some embodiments.
Figure 9A:
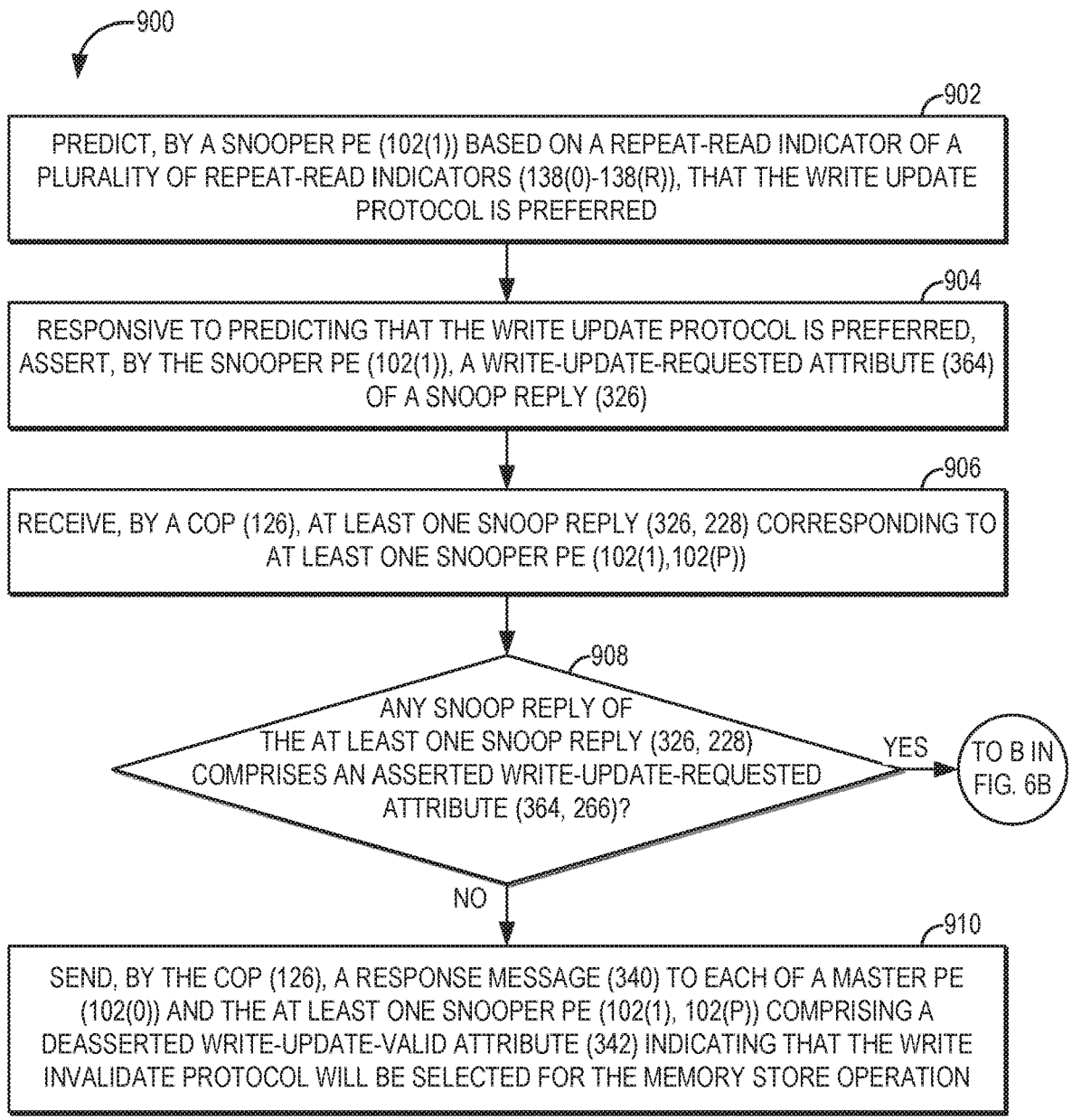
Figure 9B:
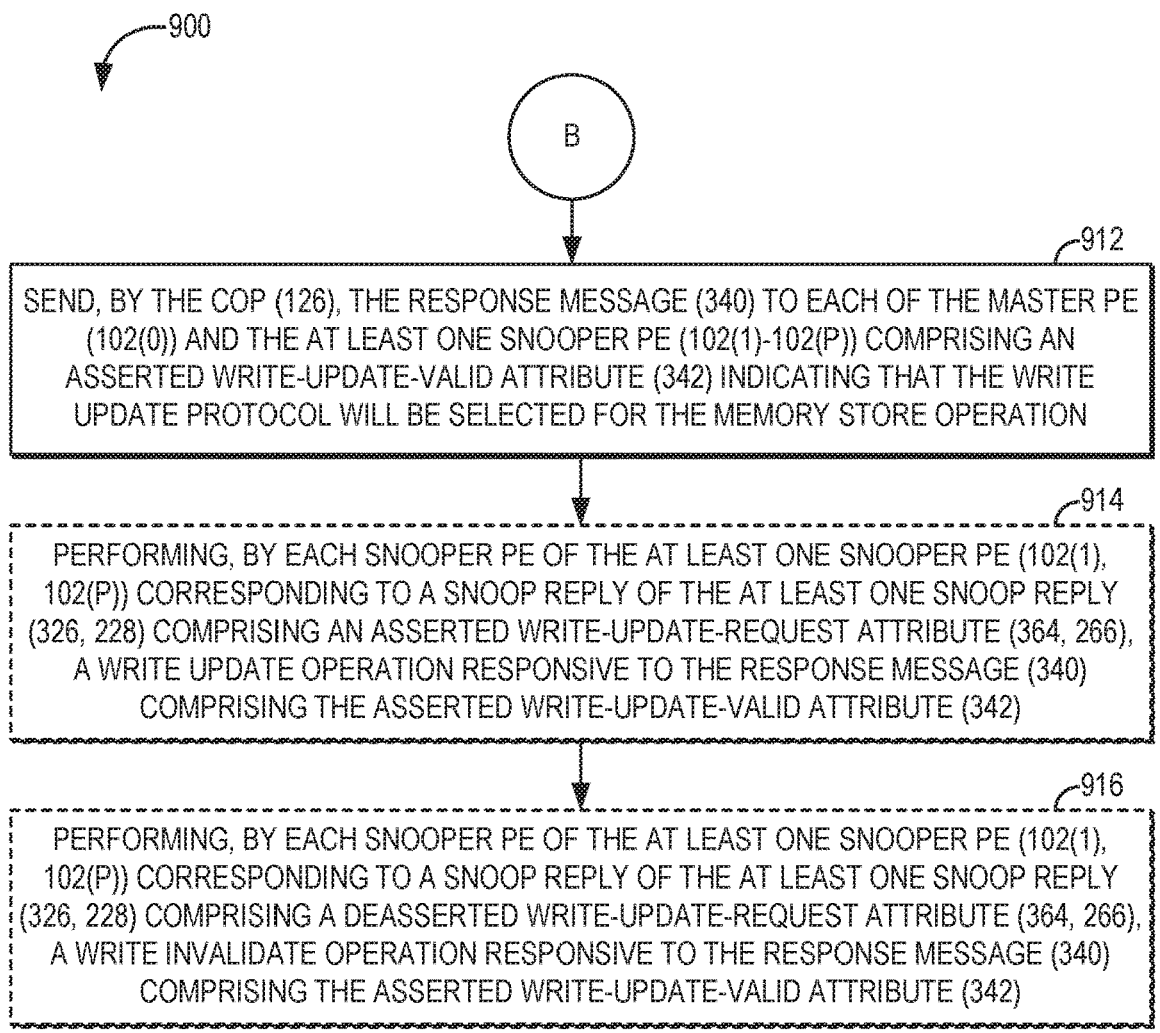
Figure 10:
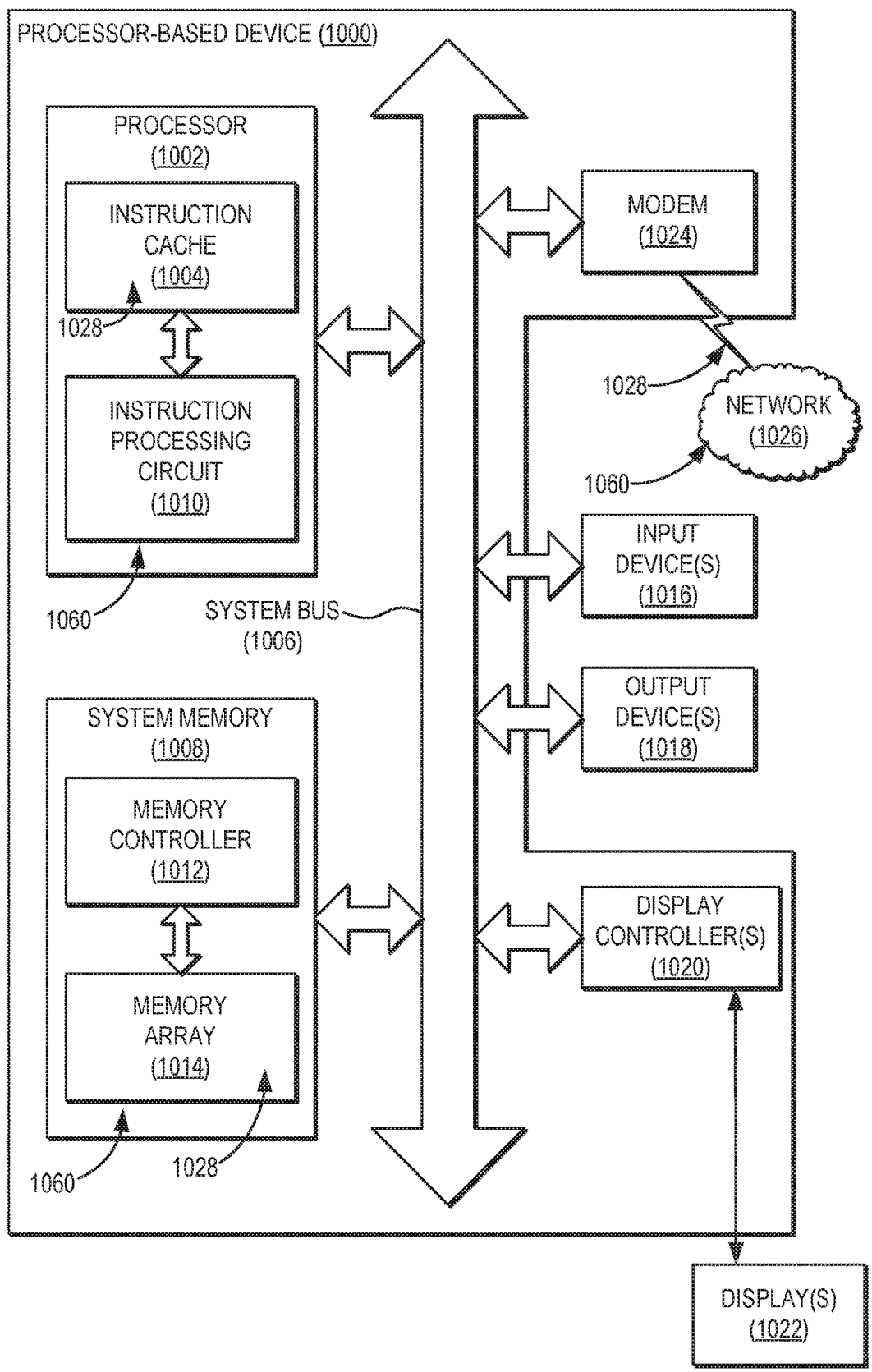

FIGS. 9A and 9B are flowcharts illustrating exemplary operations of the snooper PEs of FIG. 1 for predicting that a write update protocol is preferred, and providing protocol preference indicators to the COP, according to one embodiment; and FIG. 10 is a block diagram of an exemplary processor-based device, such as the processor-based device of FIG. 1, that is configured to track repeated reads to guide dynamic selection of cache coherence protocols in processor-based devices.

DETAILED DESCRIPTION

Exemplary embodiments disclosed herein include tracking repeated reads to guide dynamic selection of cache coherence protocols in processor-based devices. In this regard, in one exemplary embodiment, a processor-based device comprises a central ordering point circuit (COP) and a plurality of processing elements (PEs), with each PE providing a plurality of repeat-read indicators that correspond to coherence granules read by the PE. The repeat-read indicators are used by the PE to track whether a coherence granule was repeatedly read by the PE (e.g., as a result of re-reading the coherence granule due to polling, or as a result of re-reading the coherence granule after it was evicted from a cache due to an invalidating snoop). The plurality of PEs includes a master PE and at least one snooper PE. As used herein, the term "master PE" refers to a PE that performs a memory store operation, and that sends cache coherence bus commands to the COP. The term "snooper PE" refers to a PE that receives snoop commands associated with the memory store operation from the COP, and then acts on the snoop commands to maintain cache coherence. Accordingly, a PE may operate as a master PE with respect to one memory store operation, and may also operate as a snooper PE with respect to a different memory store operation.

One of the most accurate indicators of whether the write update protocol is more advantageous than the write invalidate protocol is whether a snooper PE holding a cached copy of the coherence granule being written by the cache coherence bus command has repeatedly performed read operations to that coherence granule in the past. Accordingly, after a master PE of the plurality of PEs sends a cache coherence bus command to the COP as part of a memory store operation, a PE of the plurality of PEs (e.g., the master PE or a snooper PE) uses its repeat-read indicators to generate a first protocol preference indicator to indicate whether that PE predicts that a write invalidate protocol or a write update protocol is preferred (based on a likelihood of subsequently re-reading the coherence granule as indicated by the corresponding repeat-read indicator). The PE then sends the first protocol preference indicator to the COP. Using protocol preference indicators (including the first protocol preference indicator) provided by the master PE, the snooper PE, and the COP, the COP dynamically selects, on a store-by-store basis, either the write invalidate protocol or the write update protocol as the cache coherence protocol to use for maintaining cache coherency for a memory store operation by the master PE. After selecting the cache coherence protocol to use based on the protocol preference indicators, the COP sends a response message, indicating the selected cache coherence protocol for the memory store operation, to each of the master PE and the at least one snooper PE.

In this regard, FIG. 1 illustrates an exemplary processor-based device 100 that provides a plurality of processing elements (PEs) 102(0)-102(P) for processing executable instructions. Each of the PEs 102(0)-102(P) may comprise, e.g., an individual processor core comprising a logical execution unit and associated caches and functional units. In the example of FIG. 1, each of the PEs 102(0)-102(P) includes a corresponding execution pipeline 104(0)-104(P) that is configured to perform out-of-order execution of an instruction stream comprising computer-executable instructions. As non-limiting examples, the execution pipelines 104(0)-104(P) each may include a fetch stage for retrieving instructions for execution, a decode stage for translating fetched instructions into control signals for instruction execution, a rename stage for allocating physical register file (PRF) registers, a dispatch stage for issuing instructions for execution, an execute stage for sending instructions and operands to execution units, and/or a commit stage for irrevocably updating the architectural state of the corresponding PE 102(0)-102(P) based on the results of instruction execution.

The PEs 102(0)-102(P) of the processor-based device 100 of FIG. 1 are interconnected to each other and to a system memory 106 by an interconnect bus 108. As seen in FIG. 1, the system memory 106 is subdivided into multiple coherence granules 110(0)-110(G), each representing the smallest unit of memory (e.g., 64 bytes, as a non-limiting example) for which cache coherence is maintained by the processor-based device 100. The PEs 102(0)-102(P) also include corresponding caches 112(0)-112(P) comprising cache lines 114(0)-114(C), 116(0)-116(C), and 118(0)-118(C), respectively. It is to be understood that the PEs 102(0)-102(P) may include caches in addition to the caches 112(0)-112(P) illustrated in FIG. 1, and that the caches 112(0)-112(P) may include additional elements not shown in FIG. 1, such as cache controller circuits. The caches 112(0)-112(P) are used by the respective PEs 102(0)-102(P) to locally store data read from the system memory 106 for quicker access. For example, as seen in FIG. 1, the cache lines 114(0), 116(0), and 118(0) of the corresponding caches 112(0)-112(P) store local copies ("COGRAN COPY") 120, 122, and 124, respectively, of one of the coherence granules 110(0)-110(G) (e.g., the coherence granule 110(0), as a non-limiting example).

The processor-based device 100 further includes a COP 126 that is configured to arbitrate among cache coherence bus commands received from master PEs among the PEs 102(0)-102(P), to direct snoop commands to and receive snoop replies from snooper PEs among the PEs 102(0)-102(P), and to send response messages to both master PEs and snooper PEs among the PEs 102(0)-102(P). The COP 126 may work in conjunction with a snoop filter 128 that is configured to monitor traffic on the interconnect bus 108 to track coherence states of the cache lines 114(0)-114(C), 116(0)-116(C), and 118(0)-118(C) of the PEs 102(0)-102(P).

The processor-based device 100 of FIG. 1 and the constituent elements thereof may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include elements in addition to those illustrated in FIG. 1. For example, each of the PEs 102(0)-102(P) may further include one or more functional units, instruction caches, unified caches, memory controllers, interconnect buses, and/or additional memory devices, caches, and/or controller circuits, which are omitted from FIG. 1 for the sake of clarity.

As noted above, conventional processor-based devices provide support for cache coherence protocols, such as the write invalidate protocol and the write update protocol, to enable local changes to the shared data within one PE 102(0)-102(P) to be propagated to other PEs 102(0)-102(P) to ensure that all of the PEs 102(0)-102(P) have a consistent view of the shared data. However, while the write invalidate protocol and the write update protocol each have advantages in particular circumstances, neither is equally efficient in all scenarios. Moreover, information that may be used in determining which cache coherence protocol would be most efficient in a given scenario may not be accessible by a single entity such as the COP 126 of FIG. 1, but rather may be distributed among one or more of a master PE among the PEs 102(0)-102(P), snooper PEs among the PEs 102(0)-102(P), and the COP 126.

In this regard, the processor-based device 100 of FIG. 1 is configured to provide dynamic selection of cache coherence protocols. As discussed in greater detail below with respect to FIGS. 3A-3C, the COP 126 is configured to dynamically select a cache coherence protocol (i.e., either the write invalidate protocol or the write update protocol) to use for a given memory store operation based on one or more protocol preference indicators provided by one or more of a master PE among the PEs 102(0)-102(P), at least one snooper PE among the PEs 102(0)-102(P), and the COP 126 itself. The selection of a cache coherence protocol is performed by the COP 126 on a store-by-store basis, such that different cache coherence protocols may be selected for successive memory store operations. Accordingly, instead of supporting only one cache coherence protocol (as is the case with many conventional processor-based devices), the processor-based device 100 is configured to support both the write invalidate protocol and the write update protocol.

In some embodiments, the PEs 102(0)-102(P) and the COP 126 may be configured to provide one or more protocol preference indicators based on circumstantial knowledge available to each. For example, upon executing a memory store instruction ("MEM STORE INSTR") 130, the PE 102(0), acting as a master PE, may predict that the write invalidate protocol is preferred because the PE 102(0) is aware that it will be performing subsequent multiple memory store operations to a coherence granule such as the coherence granule 110(0). Similarly, the COP 126 may predict that the write update protocol is preferred based on a number of the PEs 102(0)-102(P) holding local cached copies 120, 122, and 124 of a highly shared and contentious coherence granule. Based on the one or more protocol preference indicators received by the COP 126, the COP 126 dynamically selects the cache coherence protocol, and then communicates the selected cache coherence protocol to the PEs 102(0)-102(P). The logic for generating, providing, and evaluating such protocol preference indicators may be embodied in prediction logic circuits 132(0)-132(P) of the PEs 102(0)-102(P) and/or in the prediction logic circuit 134 of the COP 126, as non-limiting examples.

In the example of FIG. 1, the PEs 102(0)-102(P) each provide a plurality of repeat-read indicators ("RR") 136(0)-136(R), 138(0)-138(R), and 140(0)-140(R) that correspond to coherence granules that were read by the PEs 102(0)-102(P) and cached in the caches 112(0)-112(P). The repeat-read indicators 136(0)-136(R), 138(0)-138(R), and 140(0)-140(R) are used by the PEs 102(0)-102(P) to track whether (and, in some embodiments, how many times) a given coherence granule has been repeatedly read by the corresponding PEs 102(0)-102(P). The PEs 102(0)-102(P) subsequently use the repeat-read indicators 136(0)-136(R), 138(0)-138(R), and 140(0)-140(R) when generating a protocol preference indicator to send to the COP 126. As discussed in greater detail below with respect to FIGS. 2A and 2B, the repeat-read indicators 136(0)-136(R), 138(0)-138(R), and 140(0)-140(R) in some embodiments may be incorporated into the cache lines 114(0)-114(C), 116(0)-116(C), and 118(0)-118(C), respectively, while some embodiments may provide that the repeat-read indicators 136(0)-136(R), 138(0)-138(R), and 140(0)-140(R) are incorporated into a separate data structure such as a snoop eviction table (not shown).

Figure 2A:
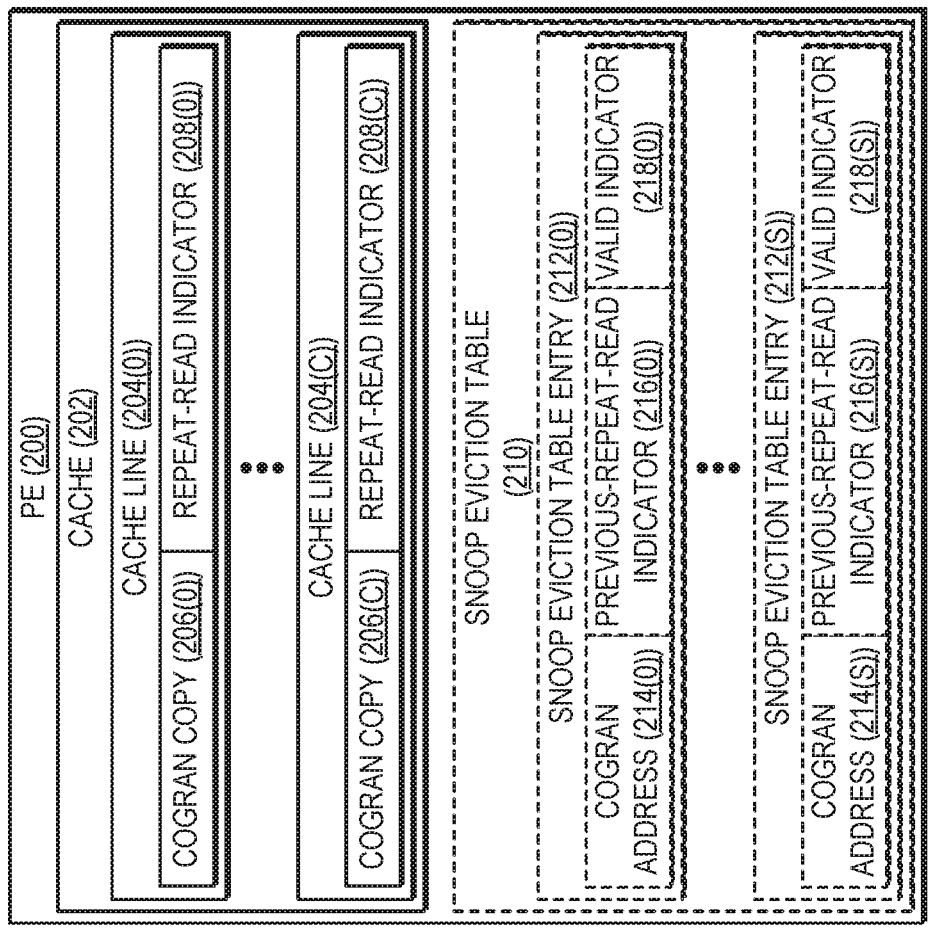
FIGS. 2A and 2B are block diagrams illustrating embodiments of the processing element (PE) of FIG. 1 configured to track repeated reads of coherence granules due to polling, and to track re-reads of cached coherence granules that are evicted after snoop invalidation, according to some embodiments.
Figure 2B:
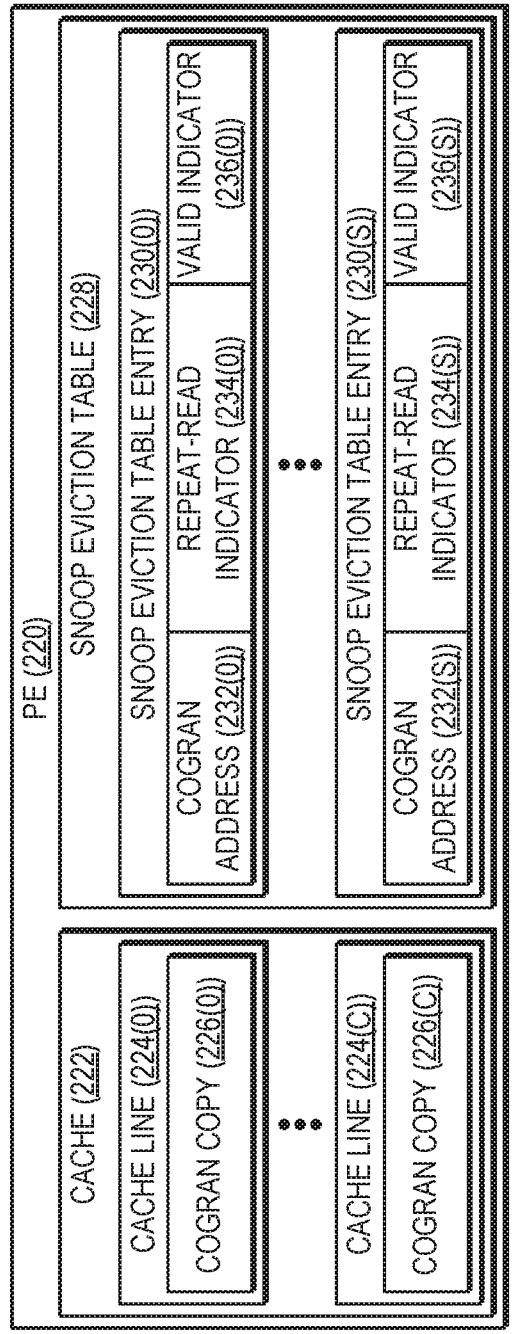

To illustrate embodiments of the PEs 102(0)-102(P) of FIG. 1 for tracking repeated reads of coherence granules, FIGS. 2A and 2B are provided. Embodiments according to FIG. 2A may use repeat-read indicators, such as the repeat-read indicators 136(0)-136(R), 138(0)-138(R), and 140(0)-140(R) of FIG. 1, to track repeated reads of coherence granules due to polling reads, and optionally may also be used to track re-reads of cached coherence granules that are evicted after snoop invalidation. Embodiments according to FIG. 2B may employ repeat-read indicators to track repeated reads of coherence granules due to snoop invalidation. Operations for initializing and incrementing repeat-read indicators are also discussed below.

In FIG. 2A, a PE 200, corresponding in functionality to any one of the PEs 102(0)-102(P) of FIG. 1, comprises a cache 202 that includes a plurality of cache lines 204(0)-204(C). The cache 202 corresponds in functionality to the caches 112(0)-112(P) of FIG. 1, while the cache lines 204(0)-204(C) correspond in functionality to the cache lines 114(0)-114(C), 116(0)-116(C), and 118(0)-118(C) of FIG. 1. Accordingly, as seen in FIG. 2A, the cache lines 204(0)-204(C) each cache corresponding coherence granule copies ("COGRAN COPY") 206(0)-206(C).

As seen in FIG. 2A, the cache lines 204(0)-204(C) also comprise corresponding repeat-read indicators 208(0)-208(C), which correspond to the repeat-read indicators 136(0)-136(R), 138(0)-138(R), and 140(0)-140(R) of FIG. 1. The repeat-read indicators 208(0)-208(C) of FIG. 2A may be used by the PE 200 to track repeated reads of corresponding coherence granules due to polling reads, reads performed in a loop while entering and exiting a power-saving state on each loop iteration, and the like, that hit on the cache 202. Each of the repeat-read indicators 208(0)-208(C) may comprise one (1) or more bits, in some embodiments.

In conventional operation, the PE 200 allocates a cache line, such as the cache line 204(0), upon a first read of a coherence granule (e.g., the coherence granule 110(0) of FIG. 1, as a non-limiting example). The repeat-read indicator 208(0) of the cache line 204(0) is initialized to a value of zero (0). Subsequently, upon determining that a locally executed read operation by the PE 200 (i.e., a read operation that is not generated by an external snoop) results in a hit on the cache line 204(0), the PE 200 increments the repeat-read indicator 208(0) of the cache line 204(0). In some embodiments, the repeat-read indicator 208(0) may saturate at its maximum value. Thus, for example, if the repeat-read indicator 208(0) comprises two (2) bits, the value of the repeat-read indicator 208(0) may be saturated at a value of three (3), which would indicate that three or more cache hits have occurred on the cache line 204(0) since the cache line 204(0) was allocated.

If the PE 200 is subsequently snooped by a cache coherence bus command (e.g., a non-allocating-write bus command, a read-with-intent-to-write bus command, or a promote-to-writeable bus command) that results in a cache hit on the cache line 204(0) in the cache 202, the PE 200 uses the repeat-read indicator 208(0) to determine whether to accept or request write update data, rather than perform a write invalidate operation. For instance, if the repeat-read indicator 208(0) comprises two (2) bits as discussed above, the PE 200 would generate a protocol preference indicator to indicate a preference for the write update protocol if the repeat-read indicator 208(0) equalled a threshold value (e.g., a value of three (3), as a non-limiting example), and would generate a protocol preference indicator to indicate a preference for the write invalidate protocol if the repeat-read indicator 208(0) had a value less than the threshold value. In some embodiments, the threshold value may be provided by a programmable threshold that can be set in firmware of the processor-based device 100.

Information regarding re-reads of a coherence granule after it has been invalidated by an external snoop (e.g., due to a write operation from another PE using the write invalidate snooping protocol) may also be useful to the PE 200 when generating a protocol preference indicator. However, the repeat-read indicators 208(0)-208(C) cannot be used for this purpose because the corresponding invalidated cache line 204(0)-204(C) may be reallocated for another coherence granule before being re-read. Accordingly, the PE 200 in some embodiments also provides a snoop eviction table 210 comprising a plurality of snoop eviction table entries 212(0)-212(S) for tracking coherence granules evicted from the cache 202. The snoop eviction table entries 212(0)-212(S) comprise corresponding coherence granule addresses ("COGRAN ADDRESS") 214(0)-214(S), previous-repeat-read indicators 216(0)-216(S), and valid indicators 218(0)-218(S).

Upon eviction of a cache line, such as the cache line 204(0), from the cache 202 by the PE due to a snoop invalidation, the PE 200 allocates a snoop eviction table entry (e.g., the snoop eviction table entry 212(0), as a non-limiting example). The PE 200 populates the coherence granule address 214(0) of the snoop eviction table entry 212(0) with the address of the corresponding coherence granule, and initializes the previous-repeat-read indicator 216(0) to a value of the repeat-read indicator 208(0) of the evicted cache line 204(0). The PE 200 also initializes the valid indicator 218(0) of the snoop eviction table entry 212(0) to indicate that the snoop eviction table entry 212(0) is valid. If the PE 200 subsequently determines that a locally executed read operation results in a miss on the cache 202 but matches a valid snoop eviction table entry (such as the snoop eviction table entry 212(0)), the PE 200 increments the previous-repeat-read indicator 216(0) (unless the previous-repeat-read indicator 216(0) is implemented as a saturating counter and has already reached its saturated value). The PE 200 then allocates a new cache line (e.g., the cache line 204(C), as a non-limiting example), and initializes the repeat-read indicator 208(C) of the newly allocated cache line 204(C) to a value of the previous-repeat-read indicator 216(0) of the snoop eviction table entry 212(0). The PE 200 also updates the valid indicator 218(0) to indicate that the snoop eviction table entry 212(0) is no longer valid.

In some embodiments, the snoop eviction table entries 212(0)-212(S) are managed using a Least Recently Used (LRU) mechanism. Accordingly, when the PE 200 needs to allocate one of the snoop eviction table entries 212(0)-212(S), the PE 200 will select an oldest snoop eviction table entry among the snoop eviction table entries 212(0)-212(S) having a valid indicator 218(0)-218(S) that indicates that the snoop eviction table entry is not valid. If all of the snoop eviction table entries 212(0)-212(S) are valid, the PE 200 selects the least recently used entry, and overwrites its contents.

FIG. 2B illustrates a PE 220, corresponding in functionality to any one of the PEs 102(0)-102(P) of FIG. 1, that is configured to track only repeated reads of coherence granules due to snoop invalidation (e.g., for workloads that may not repeatedly poll on a coherence granule while repeatedly hitting on a local cache). The PE 220 thus comprises a cache 222 that includes a plurality of cache lines 224(0)-224(C), wherein the cache 222 corresponds in functionality to the caches 112(0)-112(P) of FIG. 1 and the cache lines 224(0)-224(C) correspond in functionality to the cache lines 114(0)-114(C), 116(0)-116(C), and 118(0)-118(C) of FIG. 1.

As shown in FIG. 2A, the cache lines 224(0)-224(C) each cache corresponding coherence granule copies ("COGRAN COPY") 226(0)-226(C).

The PE 220 also provides a snoop eviction table 228 that comprises a plurality of snoop eviction table entries 230(0)-230(S) for tracking coherence granules evicted from the cache 222. The snoop eviction table entries 230(0)-230(S) comprise corresponding coherence granule addresses ("COGRAN ADDRESS") 232(0)-232(S), repeat-read indicators 234(0)-234(S), and valid indicators 236(0)-236(S). The repeat-read indicators 234(0)-234(S) correspond to the repeat-read indicators 136(0)-136(R), 138(0)-138(R), and 140(0)-140(R) of FIG. 1. According to some embodiments, each of the repeat-read indicators 208(0)-208(C) may comprise one (1) bit.

When a cache line, such as the cache line 224(0), is evicted from the cache 222 by the PE 220 due to a snoop invalidation, the PE 220 allocates a snoop eviction table entry (e.g., the snoop eviction table entry 230(0), as a non-limiting example), and populates the coherence granule address 232(0) of the snoop eviction table entry 230(0) with the address of the corresponding coherence granule. The PE 220 also initializes the repeat-read indicator 234(0) of the snoop eviction table entry 230(0) to a value of zero (0), and initializes the valid indicator 236(0) of the snoop eviction table entry 230(0) to indicate that the snoop eviction table entry 230(0) is valid. If the PE 220 subsequently determines that a locally executed read operation results in a miss on the cache 222 but matches a valid snoop eviction table entry (e.g., the snoop eviction table entry 230(0)), the PE 220 increments the repeat-read indicator 234(0) of the snoop eviction table entry 230(0). If the PE 220 is subsequently snooped by a cache coherence bus command (e.g., a non-allocating-write bus command, a read-with-intent-to-write bus command, or a promote-to-writeable bus command) that results in a cache hit on the cache 202, the PE 220 also searches the snoop eviction table 228, and will use the repeat-read indicator 234(0) (i.e., as discussed above with respect to the repeat-read indicator 208(0) of FIG. 2A) to determine whether to accept or request write update data rather than perform a write invalidate operation.

Figure 3A:
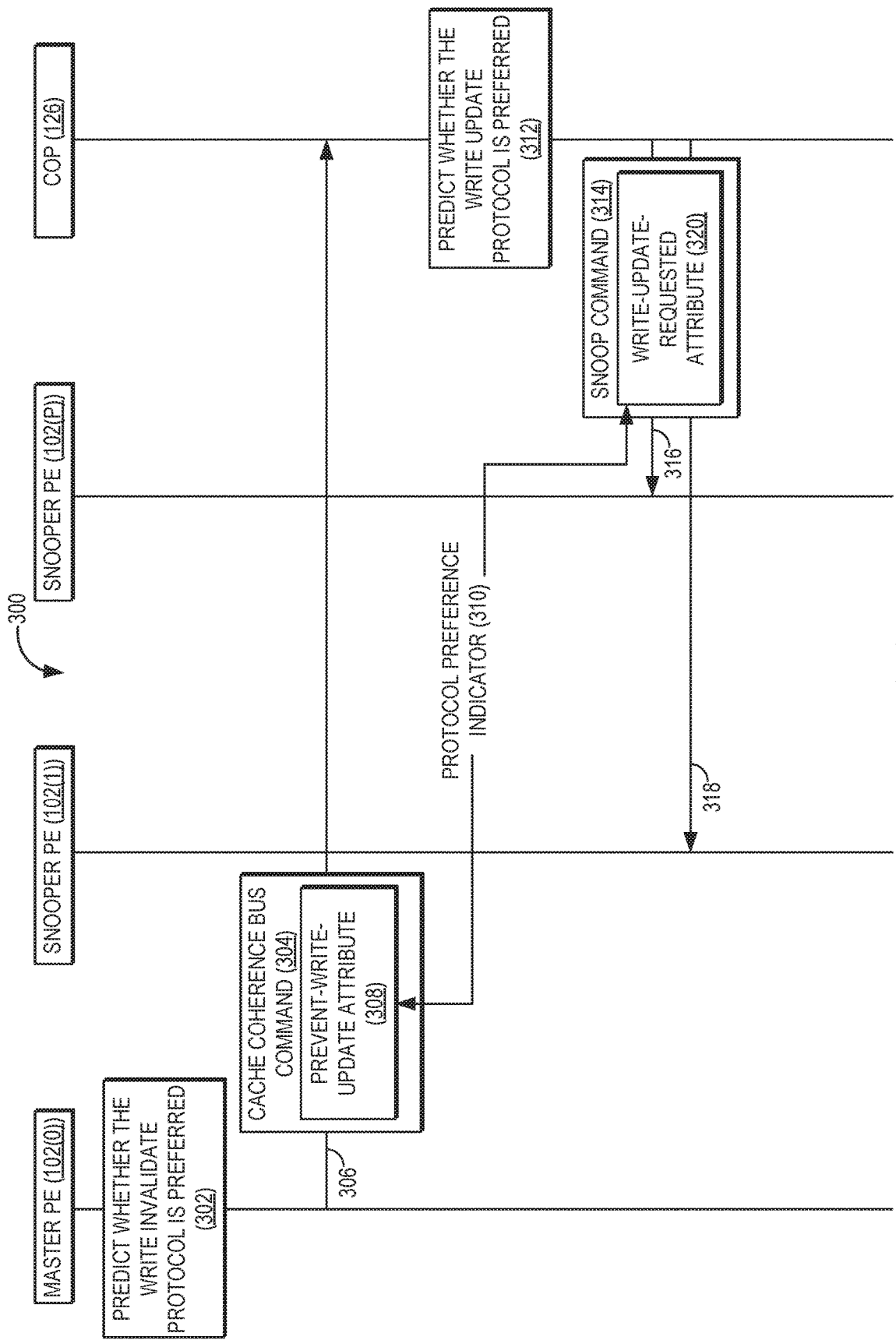
FIGS. 3A-3C are message flow diagrams illustrating exemplary communication flows between the master PE, the snooper PEs, and the COP of FIG. 1 for dynamically selecting a cache coherence protocol, according to some embodiments.
Figure 3B:
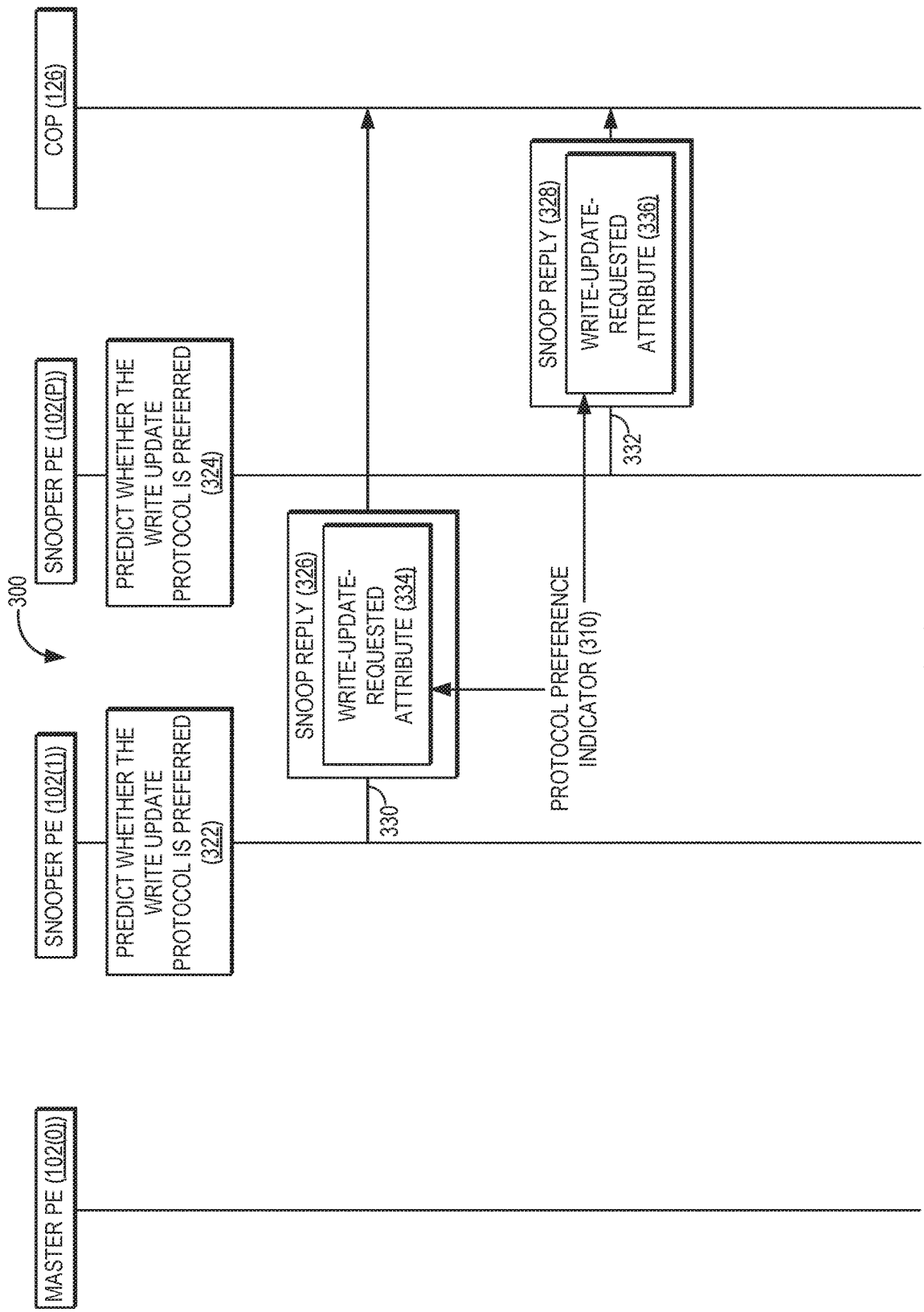
Figure 3C:
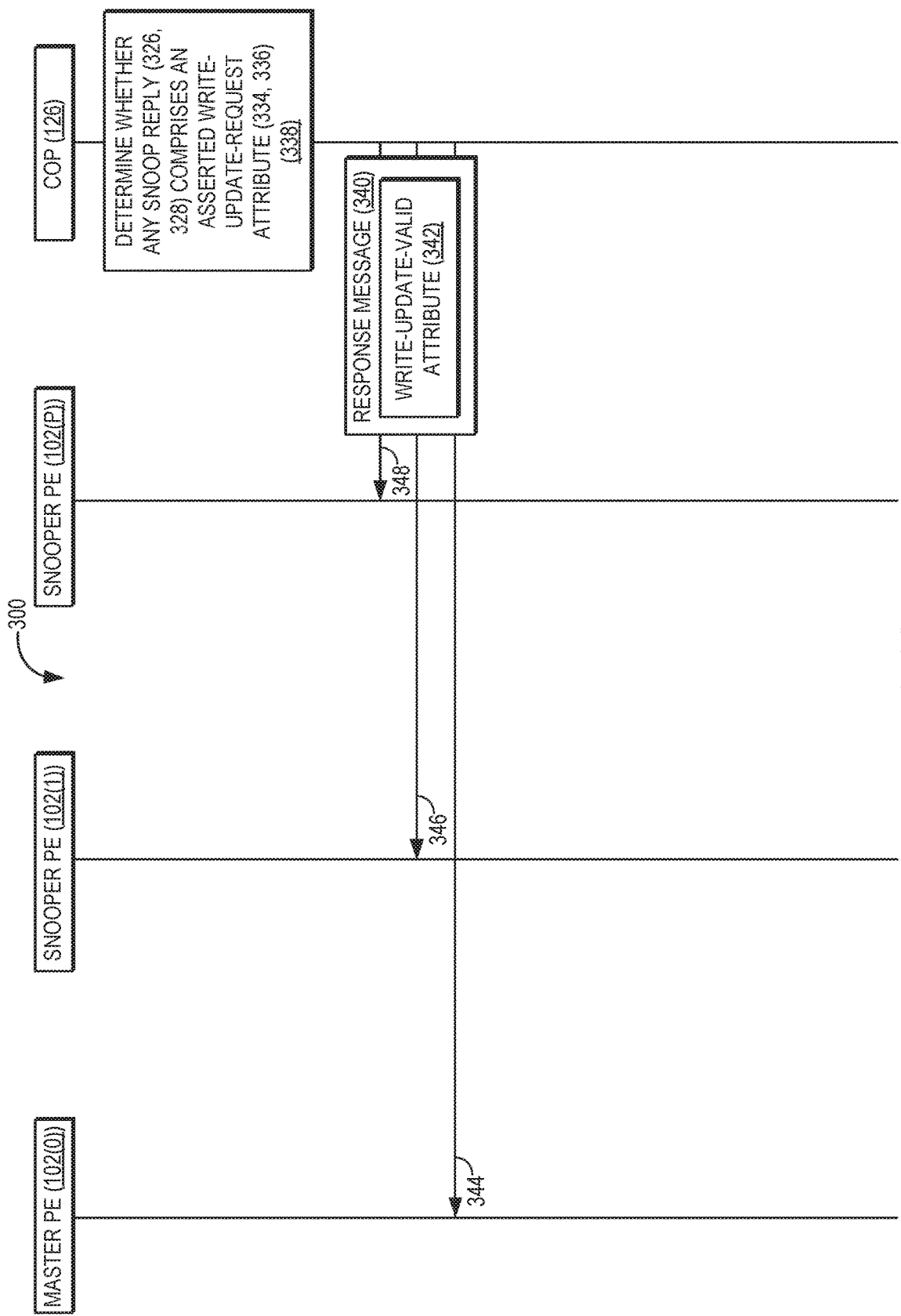

To illustrate communication flows among elements of the processor-based device 100 of FIG. 1 for generating and providing protocol preference indicators and dynamically selecting the cache coherence protocol, FIGS. 3A-3C are provided. Elements of FIG. 1 are referenced in describing FIGS. 3A-3C for the sake of clarity. As seen in FIGS. 3A-3C, a message flow diagram 300 shows the PE 102(0) (i.e., the "master PE 102(0)" in this example), the PEs 102(1) and 102(P) (i.e., the "snooper PEs 102(1) and 102(P)" in this example), and the COP 126 represented by vertical lines, with communications between these elements illustrated by captioned arrows. It is to be understood that the PE 102(0) is referred to as a "master PE" and the PEs 102(1) and 102(P) are referred to as "snooper PEs" only for purposes of illustration, and that each of the PEs 102(0)-102(P) may operate as either a master PE or a snooper PE depending on its role in a particular memory store operation. It is to be further understood that not all of the operations illustrated in FIGS. 3A-3C may be performed by all embodiments.

In FIG. 3A, operations begin with the master PE 102(0), in response to a memory store operation performed by the master PE 102(0), predicting whether the write invalidate protocol is preferred, as indicated by block 302. Generally speaking, the master PE 102(0) may defer to other agents (such as the snooper PEs 102(1) and 102(P), the COP 126, hints provided by software, and the like, as non-limiting examples) to determine whether the write update protocol is preferred. However, the master PE 102(0) in some circumstances may predict that the write update protocol would be disadvantageous, and that the write invalidate protocol is preferred. For example, if a repeat-read indicator (such as one of the repeat-read indicators 136(0)-136(R) of FIG. 1) indicates that the master PE 102(0) has repeatedly read a coherence granule, the master PE 102(0) can assume that the snooper PEs 102(1) and 102(P), if they also hold cached copies of that coherence granule, will also likely re-read the coherence granule after it is written. The master PE 102(0) thus would predict that the write update protocol is preferred.

Similarly, if the master PE 102(0) sends a promote-to-writeable bus command due to a write operation that results in a hit on the cache 112(0) in a shared (S) cache coherence state, the master PE 102(0) would predict that a write update is preferable if the corresponding repeat-read indicator 136(0)-136(R) is at its saturated value, regardless of whether the master PE 102(0) has detected multiple writes to the corresponding coherence granule. In embodiments of the master PE 102( ) that also implement a snoop eviction table, the master PE 102(0) may apply similar logic using previous-repeat-read indicators (e.g., the previous-repeat-read indicators 216(0)-216(S) of FIG. 2A) when sending a non-allocating-write bus command or a read-with-intent-to-write bus command.

Based on its prediction, the master PE 102(0) sends a cache coherence bus command 304 to the COP 126 indicating its preferred cache coherence protocol, as indicated by arrow 306. The cache coherence bus command 304 comprises a prevent-write-update attribute 308 that is asserted or deasserted by the master PE 102(0) to indicate its preference to the COP 126. As seen in FIG. 3A, the prevent-write-update attribute 308 represents one possible embodiment of a protocol preference indicator 310, and may be generally referred to as such herein. In some embodiments, a prediction by the master PE 102(0) that the write invalidate protocol is preferred will be treated as definitive by the COP 126, allowing the master PE 102(0) to disallow the use of the write update protocol for a given memory store operation. Thus, as discussed in greater detail with respect to FIG. 3B, if the master PE 102(0) in such embodiments sends the cache coherence bus command 304 to the COP 126 with the prevent-write-update attribute 308 asserted, the COP 126 sends a response message to the master PE 102(0) and the snooper PEs 102(1) and 102(P) indicating that the write invalidate protocol is selected.

In some embodiments, the cache coherence bus command 304 may comprise a non-allocating-write bus command that is sent by the master PE 102(0) responsive to a cache miss on the cache 112(0), where the memory store operation is not write-allocating in the cache 112(0) of the master PE 102(0). Some embodiments may provide that the cache coherence bus command 304 comprises a read-with-intent-to-write bus command that is sent by the master PE 102(0) responsive to a cache miss on the cache 112(0), where the memory store operation is write-allocating in the cache 112(0) of the master PE 102(0). According to some embodiments, the cache coherence bus command 304 may comprise a promote-to-writeable bus command that is sent by the master PE 102(0) responsive to a cache hit on the cache 112(0), where the cache line (e.g., the cache line 114(0), as a non-limiting example) is held in a shared coherence state.

Upon receiving the cache coherence bus command 304 from the master PE 102(0), the COP 126 next makes its own prediction regarding whether the write update protocol is preferred, as indicated by block 312. The COP 126 then sends a snoop command 314 to the snooper PEs 102(1) and 102(P), as indicated by arrows 316 and 318, respectively. The snoop command 314 comprises a write-update-requested attribute 320 that is asserted or deasserted by the COP 126 to indicate its cache coherence protocol preference to the snooper PEs 102(1) and 102(P). As noted above, in some embodiments, the COP 126 may deassert the write-update-requested attribute 320 if the master PE 102(0) sends the cache coherence bus command 304 with the prevent-write-update attribute 308 asserted. It is to be understood that, as shown in FIG. 3A, the write-update-requested attribute 320 represents another possible embodiment of the protocol preference indicator 310, and thus may be generally referred to as such herein. Operations then resume in FIG. 3B.

Referring now to FIG. 3B, each of the snooper PEs 102(1) and 102(P) may also independently predict whether the write update protocol is preferred, as indicated by blocks 322 and 324, respectively. In this manner, the snooper PEs 102(1) and 102(P) may acknowledge participation in or opt out of a requested write update (as indicated by the write-update-requested attribute 320 of the snoop command 314 being asserted), or may request the write update protocol if the write-update-requested attribute 320 of the snoop command 314 is deasserted. In the former case, if the write-update-requested attribute 320 of the snoop command 314 is asserted by the COP 126, each of the snooper PEs 102(1) and 102(P) may default to using the write update protocol unless it determines that a reason exists to opt out. As non-limiting examples, a snooper PE such as the snooper PEs 102(1) and 102(P) may decide to opt out of the use of the write update protocol because the snooper PE is unwilling to receive write update data due to a lack of resources or due to operating in a configuration in which reception of write update data is disabled. Conversely, if the write-update-requested attribute 320 of the snoop command 314 is deasserted by the COP 126, each of the snooper PEs 102(1) and 102(P) may still request the write update protocol based on its own prediction of the benefits of using the write update protocol.

According to some embodiments, the snooper PEs 102(1) and 102(P) each may base their respective predictions regarding whether the write update protocol is preferred on the likelihood of rereading the coherence granule 110(0) that is to be written by the memory store operation, based on a corresponding repeat-read indicator (e.g., the repeat-read indicators 208(0)-208(C) of FIG. 2A or the repeat-read indicators 234(0)-234(S) of FIG. 2B). If so, the snooper PEs 102(1) and 102(P) would indicate a preference for the write update protocol. Thus, for example, the snooper PEs 102(1) and 102(P) would predict that the write update protocol is preferred if the relevant repeat-read indicator is at its saturated value, and would predict that the write invalidate protocol is preferred if the repeat-read indicator is less than its saturated value.

After predicting whether the write update protocol is preferred, the snooper PEs 102(1) and 102(P) send snoop replies 326 and 328, respectively, to the COP 126, as indicated by arrows 330 and 332. The snoop replies 326 and 328 comprise write-update-requested attributes 334 and 336, respectively, which are asserted or deasserted depending on whether or not the corresponding snooper PEs 102(1) and 102(P) predicted the write update protocol to be preferred. It is to be understood that, as shown in FIG. 3B, the write-update-requested attributes 334 and 336 represent further possible embodiments of the protocol preference indicator 310, and thus may be generally referred to as such herein. Operations then resume in FIG. 3C.

Turning now to FIG. 3C, upon receiving the snoop replies 326 and 328, the COP 126 in some embodiments may then determine whether either of the snoop replies 326 and 328 comprises an asserted write-update-requested attribute 334 or 336, respectively, as indicated by block 338. Assuming that the master PE 102(0) has not precluded the use of the write update protocol (i.e., by asserting the prevent-write-update attribute 308 to indicate that the write invalidate protocol will be selected), the COP 126 will then generate a response message 340 with a write-update-valid attribute 342 that is asserted or deasserted based on the write-update-requested attributes 334 and 336, and will send the response message 340 to the master PE 102(0) and the snooper PEs 102(1) and 102(P), as indicated by arrows 344, 346, and 348, respectively. Because the snooper PEs 102(1) and 102(P) independently determine whether the write update protocol is preferred, it may be possible for both of the write-update-requested attributes 334 and 336 to be asserted, for only one of the two to be asserted, or for both to be deasserted. If any one of the write-update-requested attributes 334 and 336 are asserted (and the prevent-write-update attribute 308 of the cache coherence bus command 304 sent by the master PE 102(0) was not asserted), the COP 126 will assert the write-update-valid attribute 342 of the response message 340. However, if both of the write-update-requested attributes 334 and 336 are deasserted (or if the prevent-write-update attribute 308 of the cache coherence bus command 304 sent by the master PE 102(0) was asserted), the COP 126 will deassert the write-update-valid attribute 342 of the response message 340.

The write-update-valid attribute 342 of the response message 340 indicates to the master PE 102(0) and the snooper PEs 102(1) and 102(P) the cache coherence protocol that will be selected by the COP 126 for the memory store operation. Upon receiving the response message 340 with the write-update-valid attribute 342 asserted, the master PE 102(0) will perform the write update by sending data to the snooper PEs 102(1),102(P) for use in updating their local cached copies 122 and 124, respectively. Likewise, upon receiving the response message 340 with the write-update-valid attribute 342 asserted, any of the snooper PEs 102(1), 102(P) whose snoop reply 326, 328 included the write-update-requested attribute 334, 336 asserted will prepare to receive write update data from the master PE 102(0). Any of the snooper PEs 102(1), 102(P) whose snoop reply 326, 328 included the write-update-requested attribute 334, 336 deasserted will ignore the write-update-valid attribute 342 in the response message 340, and will perform a write invalidate.

The mechanism for dynamic selection of cache coherence protocols described herein allows either the write invalidate protocol or the write update protocol to be selected on a store-by-store basis by the COP 126 based on input from one or more of the master PE 102(0), the snooper PEs 102(1) and 102(P), and the COP 126 itself. In this manner, the cache coherence protocol providing the best performance and/or the lowest energy consumption may be employed for each memory store operation that finds a cached copy of a coherence granule in another PE 102(0)-102(P).

Figure 4:
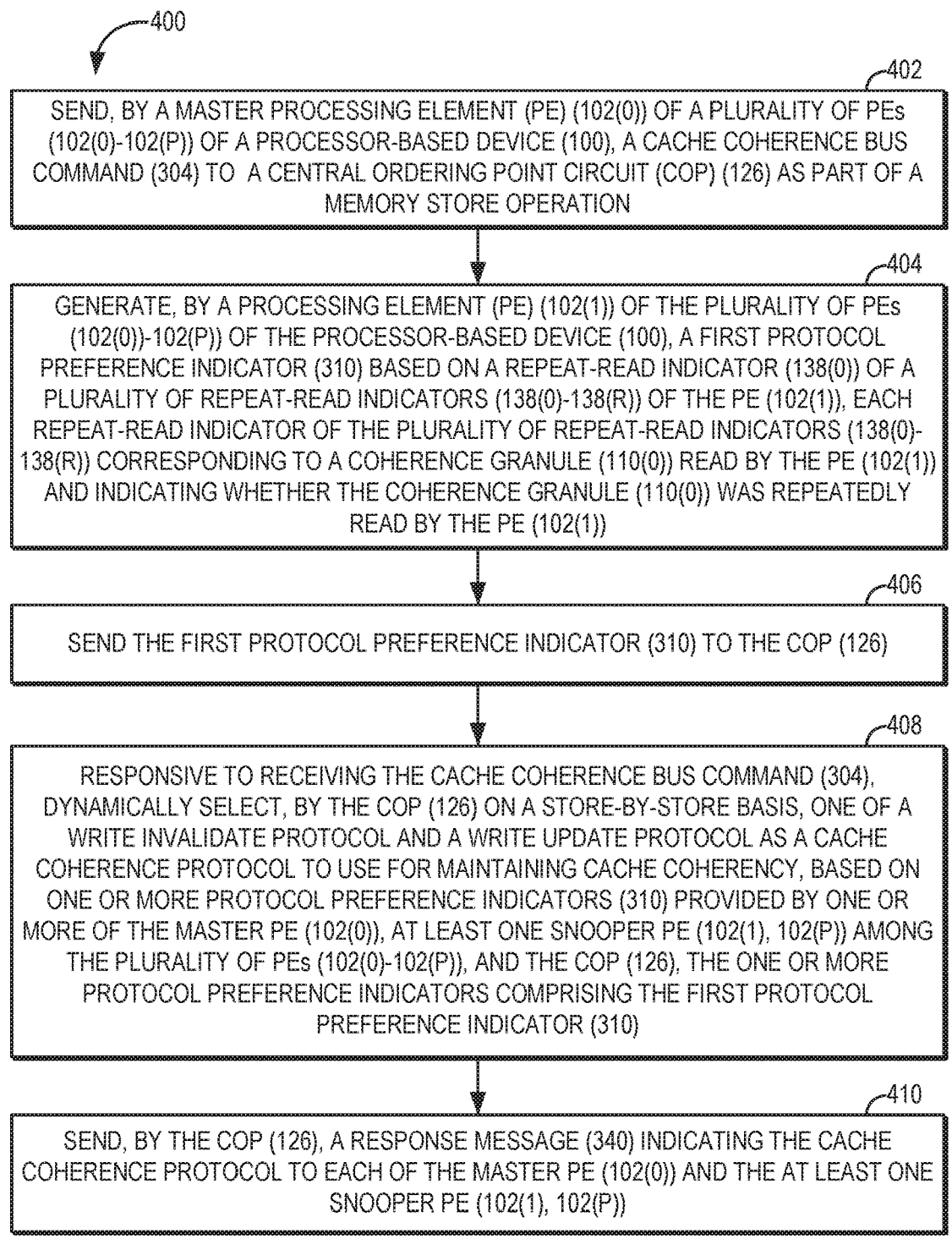
FIG. 4 is a flowchart illustrating exemplary operations for tracking repeated reads to guide dynamic selection of cache coherence protocols, according to some embodiments.

To illustrate exemplary operations for tracking repeated reads to guide dynamic selection of cache coherence protocols according to some embodiments, FIG. 4 provides a flowchart 400. Elements of FIGS. 1 and 3A-3C are referenced in describing FIG. 4, for the sake of clarity. Operations in FIG. 4 begin with a master PE (such as the PE 102(0) of FIG. 1) of the plurality of PEs 102(0)-102(P) sending the cache coherence bus command 304 to the COP 126 as part of a memory store operation (block 402). A PE (e.g., the PE 102(1) of FIG. 1) of the plurality of PEs 102(0)-102(P) of the processor-based device 100 generates the first protocol preference indicator 310 based on a repeat-read indicator (such as the repeat-read indicator 138(0) of FIG. 1) of a plurality of repeat-read indicators 138(0)-138(R) of the PE 102(1), each repeat-read indicator of the plurality of repeat-read indicators 138(0)-138(R) corresponding to a coherence granule (e.g., the coherence granule 110(0) of FIG. 1) read by the PE 102(1) and indicating whether the coherence granule 110(1) was repeatedly read by the PE 102(1) (block 404). The PE 102(1) then sends the first protocol preference indicator 310 to the COP 126 (block 406).

The COP 126, upon receiving the cache coherence bus command 304, dynamically selects, on a store-by-store basis, one of a write invalidate protocol and a write update protocol as a cache coherence protocol to use for maintaining cache coherency, based on one or more protocol preference indicators 310 provided by one or more of the master PE 102(0), at least one snooper PEs (such as the PEs 102(1) and 102(P)) among the plurality of PEs 102(0)-102(P), and the COP 126, the one or more protocol preference indicators comprising the first protocol preference indicator 310 (block 408). The COP 126 then sends the response message 340 indicating the cache coherence protocol to each of the master PE 102(0) and the at least one snooper PE 102(1), 102(P) (block 410).

Figure 5A:
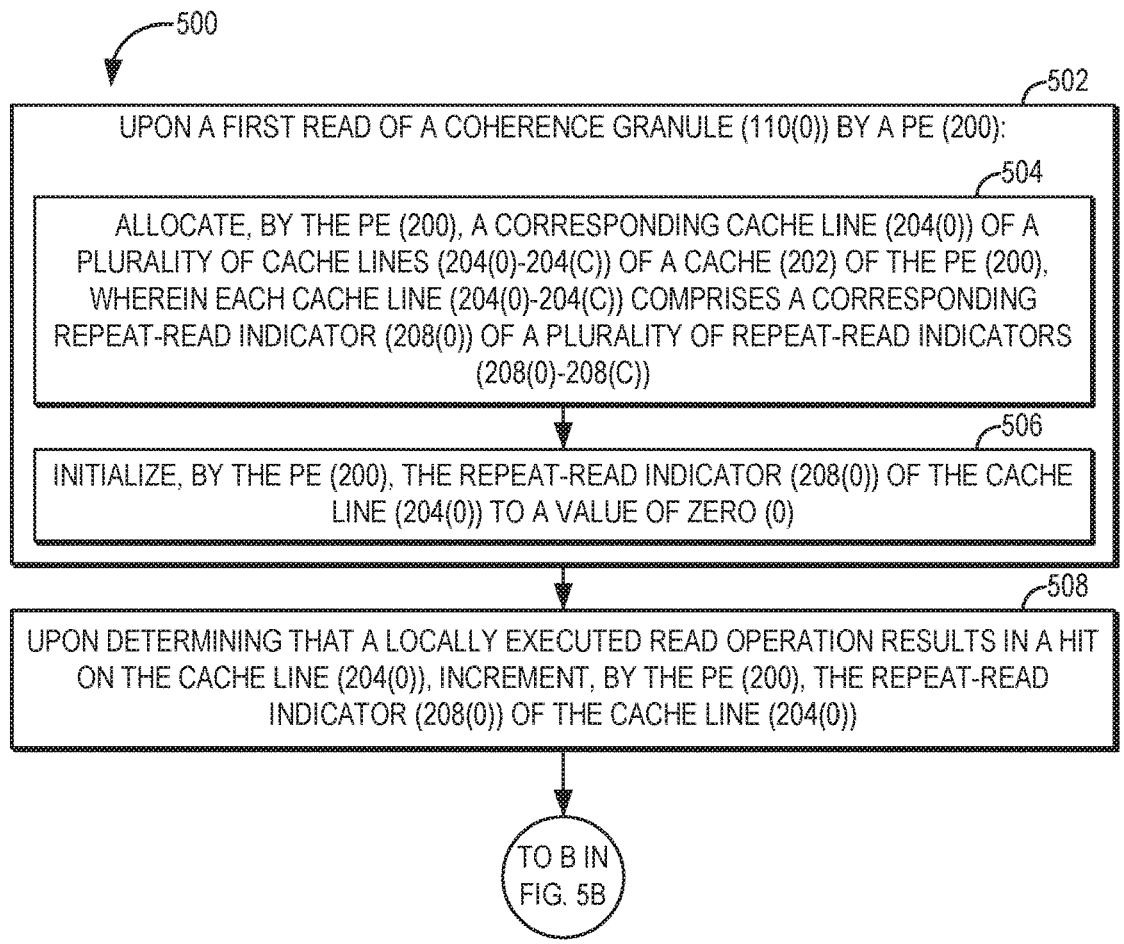
FIGS. 5A-5C are flowcharts illustrating exemplary operations for tracking repeated reads of coherence granules due to polling, and to track re-reads of cached coherence granules that are evicted after snoop invalidation, according to some embodiments.
Figure 5B:
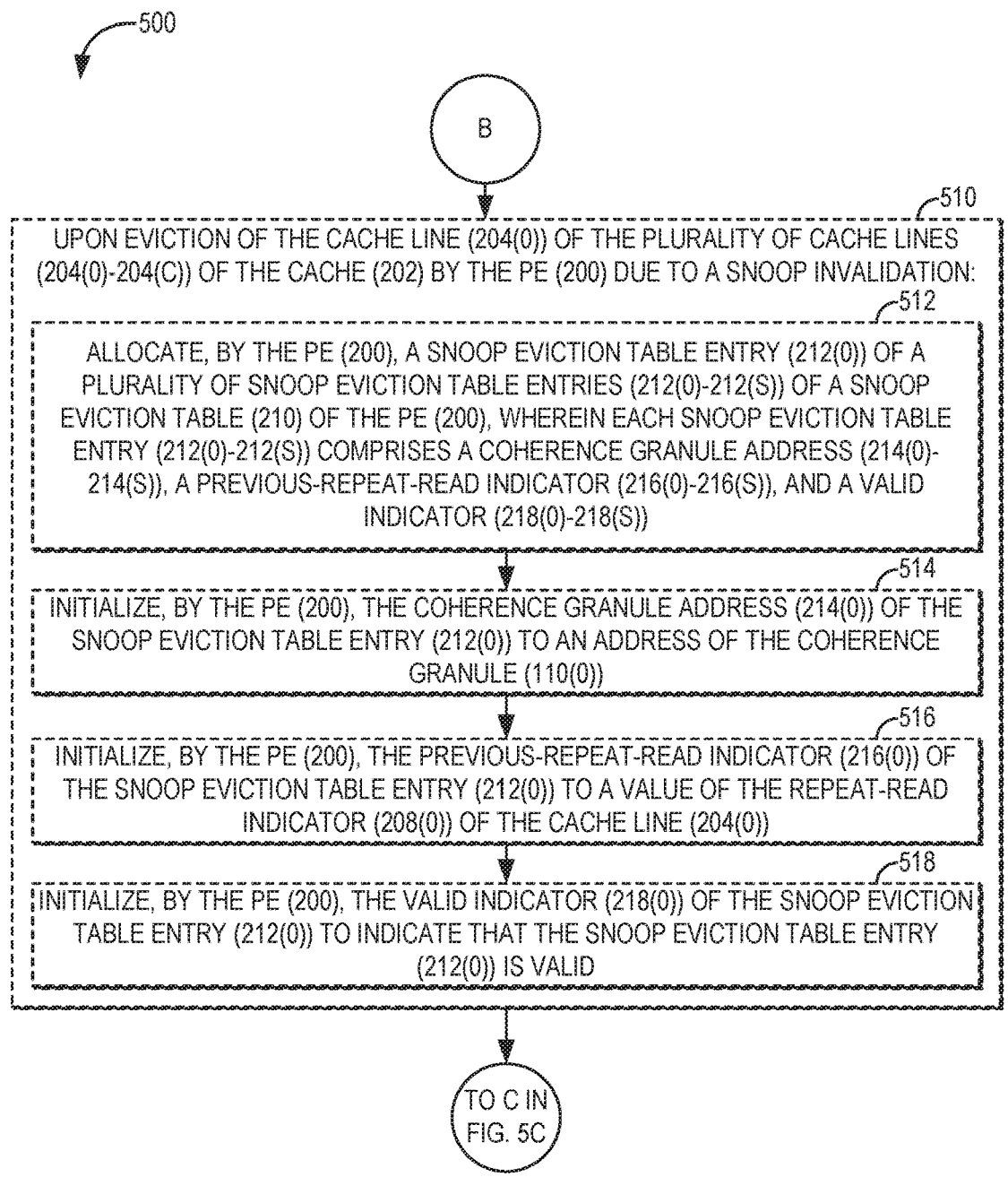
Figure 5C:
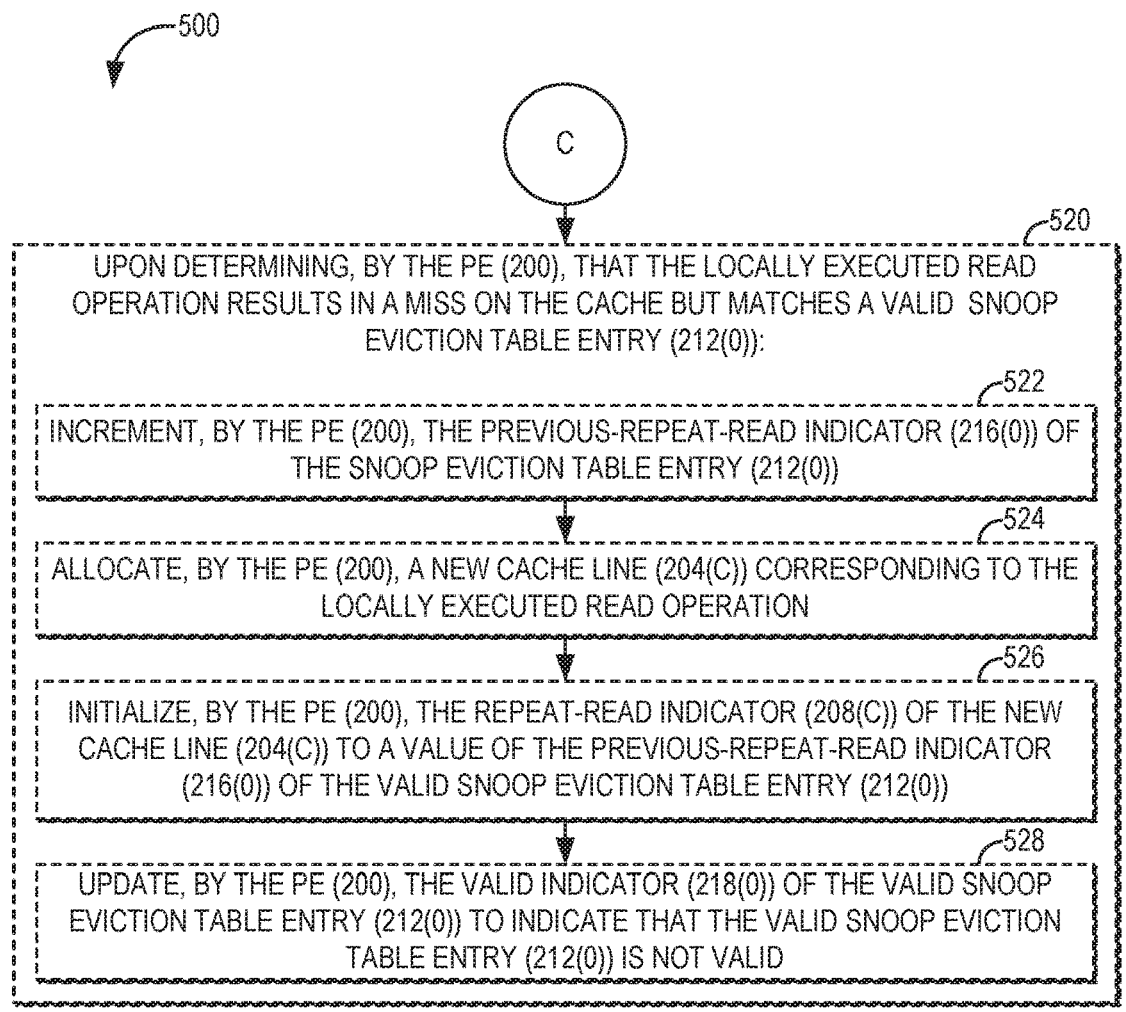

FIGS. 5A-5C provide a flowchart 500 to illustrate exemplary operations for tracking repeated reads of coherence granules due to polling, and to track re-reads of cached coherence granules that are evicted after snoop invalidation, according to some embodiments. For the sake of clarity, elements of FIGS. 1 and 2A are referenced in describing FIGS. 5A-5C. In FIG. 5A, operations begin with a PE, such as the PE 200, performing a series of operations upon a first read of a coherence granule (e.g., the coherence granule 110(0) of FIG. 1) by the PE 200 (block 502). The PE 200 allocates a corresponding cache line (such as the cache line 204(0)) of the plurality of cache lines 204(0)-204(C) of the cache 202 of the PE 200, wherein each cache line 204(0)-204(C) comprises a corresponding repeat-read indicator of the plurality of repeat-read indicators 208(0)-208(C) (block 504). The PE 200 then initializes the repeat-read indicator 208(0) of the cache line 204(0) to a value of zero (0) (block 506). Upon determining that a locally executed read operation results in a hit on the cache line 204(0), the PE 200 increments the repeat-read indicator 208(0) of the cache line 204(0) (block 508). Operations in some embodiments then continue at block 510 of FIG. 5B.

Turning now to FIG. 5B, in embodiments in which the PE 200 also includes the snoop eviction table 210, the PE 200 also performs a series of operations upon eviction of the cache line 204(0) of the plurality of cache lines 204(0)-204(C) of the cache 202 by the PE 200 due to a snoop invalidation (block 510). The PE 200 allocates a snoop eviction table entry (e.g., the snoop eviction table entry 212(0)) of the plurality of snoop eviction table entries 212(0)-212(S) of the snoop eviction table 210 of the PE 200, wherein each snoop eviction table entry 212(0)-212(S) comprises the coherence granule address 214(0)-214(S), the previous-repeat-read indicator 216(0)-216(S) and the valid indicator 218(0)-218(S) (block 512). The PE 200 initializes the coherence granule address 214(0) of the snoop eviction table entry 212(0) to an address of the coherence granule 110(0) (block 514). The PE 200 then initializes the previous-repeat-read indicator 216(0) of the snoop eviction table entry 212(0) to a value of the repeat-read indicator 208(0) of the cache line 204(0) (block 516). The PE 200 also initializes the valid indicator 218(0) of the snoop eviction table entry 212(0) to indicate that the snoop eviction table entry 212(0) is valid (block 518). Operations then continue at block 520 of FIG. 5C.

Referring now to FIG. 5C, the PE 200 performs a series of operations upon determining that the locally executed read operation results in a miss on the cache but matches a valid snoop eviction table entry, such as the snoop eviction table entry 212(0) (block 520). The PE 200 increments the previous-repeat-read indicator 216(0) of the snoop eviction table entry 212(0) (block 522). The PE 200 next allocates a new cache line corresponding to the locally executed read operation (such as the cache line 204(C)) of the plurality of cache lines 204(0)-204(C) (block 524). The PE 200 then initializes the repeat-read indicator 208(C) of the new cache line 204(C) to a value of the previous-repeat-read indicator 216(0) of the valid snoop eviction table entry 212(0) (block 526). The PE 200 also updates the valid indicator 218(0) of the valid snoop eviction table entry 212(0) to indicate that the valid snoop eviction table entry 212(0) is not valid (block 528).

Figure 6:
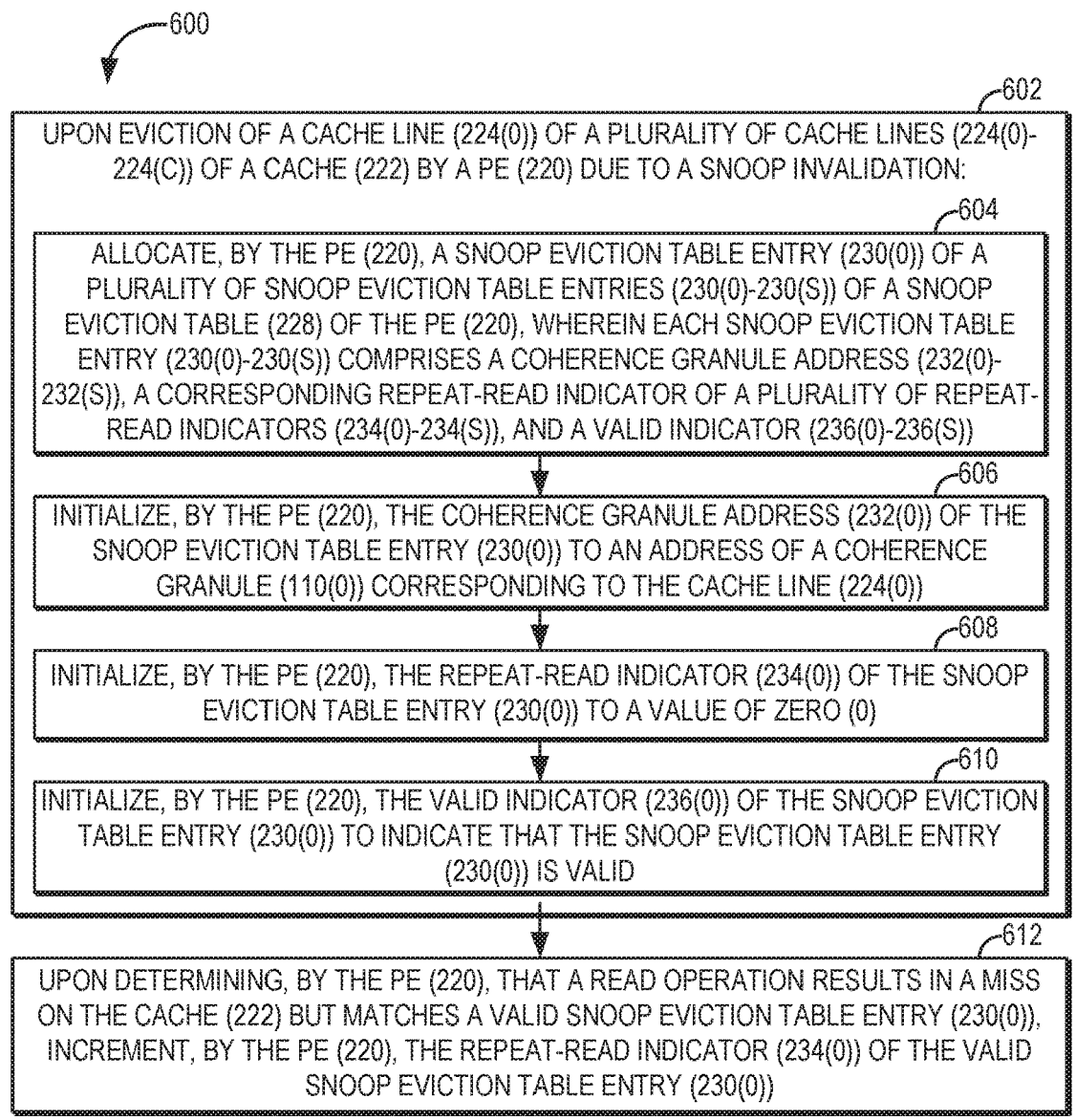
FIG. 6 is a flowchart illustrating exemplary operations for tracking re-reads of cached coherence granules that are evicted after snoop invalidation, according to further embodiments.

FIG. 6 provides a flowchart 600 to illustrate exemplary operations for tracking re-reads of cached coherence granules that are evicted after snoop invalidation, according to further embodiments. Elements of FIGS. 1 and 2B are referenced in describing FIG. 6 for the sake of clarity. Operations in FIG. 6 begin with a PE (such as the PE 220 of FIG. 2B) performing a series of operations upon eviction of a cache line (e.g., the cache line 224(0)) of the plurality of cache lines 224(0)-224(C) of the cache 222 by the PE 220 due to a snoop invalidation (block 602). The PE 220 allocates a snoop eviction table entry (such as the snoop eviction table entry 230(0)) of the plurality of snoop eviction table entries 230(0)-230(S) of the snoop eviction table 228 of the PE 220, wherein each snoop eviction table entry 230(0)-230(S) comprises the coherence granule address 232(0)-232(S), the corresponding repeat-read indicator of the plurality of repeat-read indicators 234(0)-234(S), and the valid indicator 236(0)-236(S) (block 604). The PE 220 initializes the coherence granule address 232(0) of the snoop eviction table entry 230(0) to an address of a coherence granule corresponding to the cache line 224(0) (e.g., the coherence granule 110(0)) (block 606). The PE 220 also initializes the repeat-read indicator 234(0) of the snoop eviction table entry 230(0) to a value of zero (0) (block 608). Additionally, the PE 220 initializes the valid indicator 236(0) of the snoop eviction table entry 230(0) to indicate that the snoop eviction table entry 230(0) is valid (block 610). Upon determining, by the PE 220, that a read operation results in a miss on the cache 222 but matches a valid snoop eviction table entry (such as the snoop eviction table entry 230(0)), the PE 220 increments the repeat-read indicator 234(0) of the valid snoop eviction table entry 230(0) (block 612).

Figure 7:
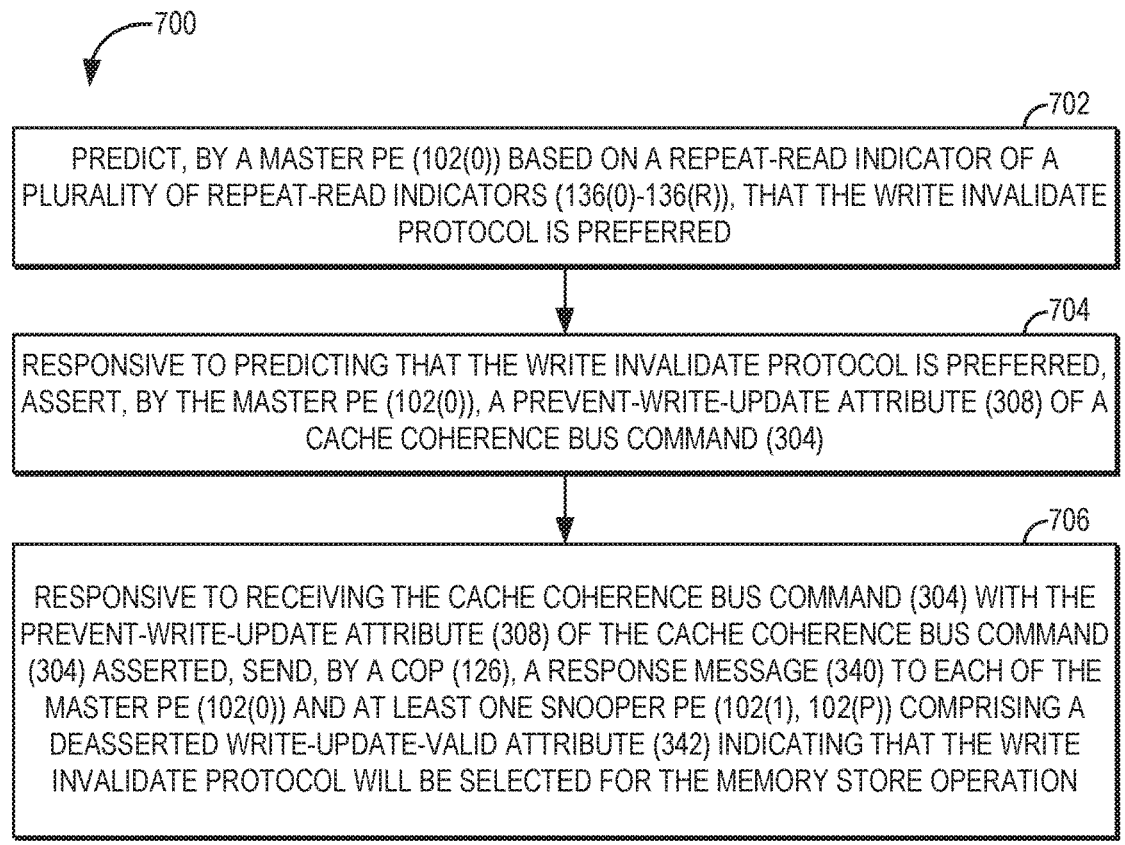
FIG. 7 is a flowchart illustrating further exemplary operations of the master PE of FIG. 1 for predicting that a write invalidate protocol is preferred, and providing protocol preference indicators to the COP, according to one embodiment.

FIG. 7 provides a flowchart 700 illustrating further exemplary operations of the master PE 102(0) of FIGS. 1 and 3A-3C for predicting that a write invalidate protocol is preferred, and providing protocol preference indicators 310 to the COP 126, according to one embodiment. Elements of FIGS. 1 and 3A-3C are referenced in describing FIG. 7 for the sake of clarity. In FIG. 7, operations begin with the master PE 102(0) predicting, based on a repeat-read indicator of the plurality of repeat-read indicators (such as the repeat-read indicators 136(0)-136(R) of FIG. 1), that the write invalidate protocol is preferred (block 702). Responsive to predicting that the write invalidate protocol is preferred, the master PE 102(0) asserts the prevent-write-update attribute 308 of the cache coherence bus command 304 (block 704). The COP 126, in response to receiving the cache coherence bus command 304 with the prevent-write-update attribute 308 of the cache coherence bus command 304 asserted, sends the response message 340 to each of the master PE 102(0) and the at least one snooper PE 102(1), 102(P) comprising a deasserted write-update-valid attribute 342 indicating that the write invalidate protocol will be selected for the memory store operation (block 706).

Figure 8:
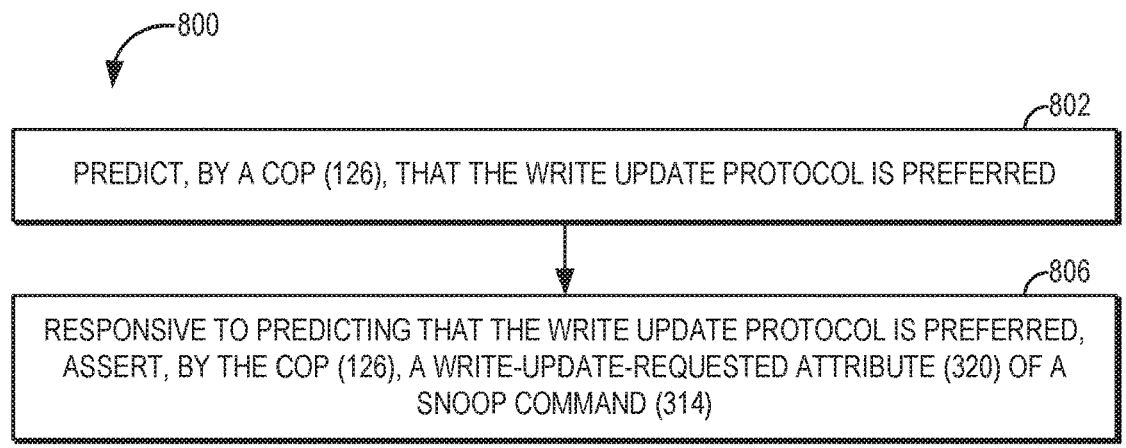
FIG. 8 is a flowchart illustrating exemplary operations of the COP of FIG. 1 for predicting that a write update protocol is preferred, according to one embodiment.

To illustrate exemplary operations of the COP 126 of FIG. 1 for predicting that a write update protocol is preferred according to one embodiment, FIG. 8 provides a flowchart 800. For the sake of clarity, elements of FIGS. 1 and 3A-3C are referenced in describing FIG. 8. Operations in FIG. 8 begin with the COP 126 predicting that the write update protocol is preferred (block 802). Responsive to predicting that the write update protocol is preferred, the COP 126 asserts the write-update-requested attribute 320 of the snoop command 314 (block 806).

FIGS. 9A and 9B provide a flowchart 900 illustrating exemplary operations of the snooper PEs 102(1) and 102(P) of FIGS. 1 and 3A-3C for predicting that a write update protocol is preferred, and providing protocol preference indicators 310 to the COP 126, according to one embodiment. In aspects according to FIGS. 9A and 9B, it is assumed that the cache coherence bus command 304 is sent by the master PE 102(0) to the COP 126 with its prevent-write-update attribute 308 deasserted, thus allowing the COP 126 and the snooper PEs 102(1) and 102(P) to make their own predictions regarding the preferred cache coherence protocol. Elements of FIGS. 1 and 3A-3C are referenced in describing FIGS. 9A and 9B for the sake of clarity. In FIG. 9A, operations begin with a snooper PE (such as the snooper PE 102(1)), predicting, based on a repeat-read indicator of a plurality of repeat-read indicators (e.g., the repeat-read indicators 138(0)-138(R) of FIG. 1), that the write update protocol is preferred (block 902).

Responsive to predicting that the write update protocol is preferred, the snooper PE 102(1) asserts the write-update-requested attribute 334 of the snoop reply 326 (block 904). The COP 126 subsequently receives at least one snoop reply 326, 328 corresponding to the at least one snooper PE 102(1), 102(P) (block 906). The COP 126 then determines whether any snoop reply of the at least one snoop reply 326, 328 comprises an asserted write-update-requested attribute 334, 336 (block 908). If not, the COP 126 sends the response message 340 to each of the master PE 102(0) and the at least one snooper PE 102(1), 102(P) comprising the deasserted write-update-valid attribute 342 indicating that the write invalidate protocol will be selected for the memory store operation (block 910). If the COP 126 determines at decision block 910 that any of the at least one snoop reply 326, 328 comprises an asserted write-update-requested attribute 334, 336, processing resumes at block 912 in FIG. 9B.

Referring now to FIG. 9B, the COP 126 sends the response message 340 to each of the master PE 102(0) and the at least one snooper PE 102(1), 102(P) comprising an asserted write-update-valid attribute 342 indicating that the write update protocol will be selected for the memory store operation (block 912). In some embodiments, upon receiving the response message 340 comprising the asserted write-update-valid attribute 342, each snooper PE of the at least one snooper PE 102(1), 102(P) that corresponds to a snoop reply of the at least one snoop reply 326, 328 comprising an asserted write-update-requested attribute 334, 336 may perform a write update operation (block 914). Likewise, each snooper PE of the at least one snooper PE 102(1), 102(P) that corresponds to a snoop reply of the at least one snoop reply 326, 328 comprising a deasserted write-update-requested attribute 334, 336 may perform a write invalidate operation responsive to the response message 340 comprising the asserted write-update-valid attribute 342 (block 916).

FIG. 10 is a block diagram of an exemplary processor-based device 1000, such as the processor-based device 100 of FIG. 1, that provides dynamic selection of cache coherence protocols. The processor-based device 1000 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 1000 includes a processor 1002. The processor 1002 represents one or more general-purpose processing circuits, such as a microprocessor, central processing unit, or the like, and may correspond to the PEs 102(0)-102(P) of FIG. 1. The processor 1002 is configured to execute processing logic in instructions for performing the operations and steps discussed herein. In this example, the processor 1002 includes an instruction cache 1004 for temporary, fast access memory storage of instructions and an instruction processing circuit 1010. Fetched or prefetched instructions from a memory, such as from a system memory 1008 over a system bus 1006, are stored in the instruction cache 1004. The instruction processing circuit 1010 is configured to process instructions fetched into the instruction cache 1004 and process the instructions for execution.

The processor 1002 and the system memory 1008 are coupled to the system bus 1006 and can intercouple peripheral devices included in the processor-based device 1000. As is well known, the processor 1002 communicates with these other devices by exchanging address, control, and data information over the system bus 1006. For example, the processor 1002 can communicate bus transaction requests to a memory controller 1012 in the system memory 1008 as an example of a peripheral device. Although not illustrated in FIG. 10, multiple system buses 1006 could be provided, wherein each system bus constitutes a different fabric. In this example, the memory controller 1012 is configured to provide memory access requests to a memory array 1014 in the system memory 1008. The memory array 1014 is comprised of an array of storage bit cells for storing data. The system memory 1008 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 1006. As illustrated in FIG. 10, these devices can include the system memory 1008, one or more input device(s) 1016, one or more output device(s) 1018, a modem 1024, and one or more display controller(s) 1020, as examples. The input device(s) 1016 can include any type of input device, including, but not limited to, input keys, switches, voice processors, etc. The output device(s) 1018 can include any type of output device, including, but not limited to, audio, video, other visual indicators, etc. The modem 1024 can be any device configured to allow exchange of data to and from a network 1026. The network 1026 can be any type of network, including, but not limited to, a wired or wireless network, a private or public network, a local area network (LAN), a wireless local area network (WLAN), a wide area network (WAN), a BLUETOOTH™ network, and the Internet. The modem 1024 can be configured to support any type of communications protocol desired. The processor 1002 may also be configured to access the display controller(s) 1020 over the system bus 1006 to control information sent to one or more display(s) 1022. The display(s) 1022 can include any type of display, including, but not limited to, a cathode ray tube (CRT), a liquid crystal display (LCD), a plasma display, etc.

The processor-based device 1000 in FIG. 10 may include a set of instructions 1028 to be executed by the processor 1002 for any application desired according to the instructions. The instructions 1028 may be stored in the system memory 1008, processor 1002, and/or instruction cache 1004 as examples of non-transitory computer-readable medium 1030. The instructions 1028 may also reside, completely or at least partially, within the system memory 1008 and/or within the processor 1002 during their execution. The instructions 1028 may further be transmitted or received over the network 1026 via the modem 1024, such that the network 1026 includes the computer-readable medium 1030.

While the computer-readable medium 1030 is shown in an exemplary embodiment to be a single medium, the term "computer-readable medium" should be taken to include a single medium or multiple media (e.g., a centralized or distributed database, and/or associated caches and servers) that store the one or more sets of instructions 1028. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software process.

The embodiments disclosed herein may be provided as a computer program product, or software process, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device, comprising:
   a plurality of processing elements (PE), each comprising a plurality of repeat-read indicators each corresponding to a coherence granule read by the PE and indicating whether the coherence granule was repeatedly read by the PE;
   a central ordering point circuit (COP);
   a master PE among the plurality of PEs configured to send a cache coherence bus command to the COP as part of a memory store operation; and
   a PE of the plurality of PEs configured to:
      generate a first protocol preference indicator based on a repeat-read indicator of the plurality of repeat-read indicators; and
      send the first protocol preference indicator to the COP;
   the COP configured to:
      responsive to receiving the cache coherence bus command, dynamically select, on a store-by-store basis, one of a write invalidate protocol and a write update protocol as a cache coherence protocol to use for maintaining cache coherency, based on one or more protocol preference indicators provided by one or more of the master PE, at least one snooper PE among the plurality of PEs, and the COP, the one or more protocol preference indicators comprising the first protocol preference indicator; and
      send a response message indicating the selected cache coherence protocol to each of the master PE and the at least one snooper PE.

2. The processor-based device of claim 1, wherein:
the plurality of PEs each further comprises a cache comprising a plurality of cache lines, wherein each cache line comprises a corresponding repeat-read indicator of the plurality of repeat-read indicators; and
the PE of the plurality of PEs is further configured to:
upon a first read of a coherence granule:
allocate a corresponding cache line of the plurality of cache lines of the cache; and
initialize the repeat-read indicator of the cache line to a value of zero (0); and
upon determining that a locally executed read operation results in a hit on the cache line, increment the repeat-read indicator of the cache line.

3. The processor-based device of claim 2, wherein each repeat-read indicator of the plurality of repeat-read indicators comprises one or more bits.

4. The processor-based device of claim 2, wherein:
the plurality of PEs each further comprises a snoop eviction table comprising a plurality of snoop eviction table entries, wherein each snoop eviction table entry comprises:
a coherence granule address;
a previous-repeat-read indicator; and
a valid indicator; and
the PE of the plurality of PEs is further configured to:
upon eviction of the cache line of the plurality of cache lines of the cache due to a snoop invalidation:
allocate a snoop eviction table entry of the plurality of snoop eviction table entries;
initialize the coherence granule address of the snoop eviction table entry to an address of the coherence granule;
initialize the previous-repeat-read indicator of the snoop eviction table entry to a value of the repeat-read indicator of the cache line; and
initialize the valid indicator of the snoop eviction table entry to indicate that the snoop eviction table entry is valid; and
upon determining that the locally executed read operation results in a miss on the cache but matches a valid snoop eviction table entry:
increment the previous-repeat-read indicator of the valid snoop eviction table entry;
allocate a new cache line corresponding to the locally executed read operation;
initialize the repeat-read indicator of the new cache line to a value of the previous-repeat-read indicator of the valid snoop eviction table entry; and
update the valid indicator of the valid snoop eviction table entry to indicate that the valid snoop eviction table entry is not valid.

5. The processor-based device of claim 1, wherein:
the plurality of PEs each further comprises:
a cache comprising a plurality of cache lines; and
a snoop eviction table comprising a plurality of snoop eviction table entries, wherein each snoop eviction table entry comprises:
a coherence granule address;
a corresponding repeat-read indicator of the plurality of repeat-read indicators; and
a valid indicator; and
the PE of the plurality of PEs is further configured to:
upon eviction of a cache line of the plurality of cache lines of the cache due to a snoop invalidation:
allocate a snoop eviction table entry of the plurality of snoop eviction table entries;
initialize the coherence granule address of the snoop eviction table entry to an address of a coherence granule corresponding to the cache line;
initialize the repeat-read indicator of the snoop eviction table to a value of zero (0); and
initialize the valid indicator to indicate that the snoop eviction table entry is valid; and
upon determining that a read operation results in a miss on the cache but matches a valid snoop eviction table entry, increment the repeat-read indicator of the valid snoop eviction table entry.

6. The processor-based device of claim 5, wherein each repeat-read indicator of the plurality of repeat-read indicators comprises one (1) bit.

7. The processor-based device of claim 1, wherein the cache coherence bus command comprises one of a non-allocating-write bus command, a read-with-intent-to-write bus command, and a promote-to-writeable bus command.

8. The processor-based device of claim 1, wherein:
the one or more protocol preference indicators comprises a prevent-write-update attribute of the cache coherence bus command by the master PE; and
the master PE is further configured to:
predict, based on a repeat-read indicator of the plurality of repeat-read indicators, whether the write invalidate protocol is preferred;
responsive to predicting that the write invalidate protocol is preferred, assert the prevent-write-update attribute of the cache coherence bus command; and
responsive to predicting that the write invalidate protocol is not preferred, deassert the prevent-write-update attribute of the cache coherence bus command.

9. The processor-based device of claim 8, wherein the COP is configured to send the response message to each of the master PE and the at least one snooper PE indicating the selected cache coherence protocol by being configured to, responsive to receiving the cache coherence bus command with the prevent-write-update attribute of the cache coherence bus command asserted, send the response message to each of the master PE and the at least one snooper PE comprising a deasserted write-update-valid attribute indicating that the write invalidate protocol is selected for the memory store operation.

10. The processor-based device of claim 1, wherein:
the one or more protocol preference indicators comprises a write-update-requested attribute of a snoop reply that is associated with a snoop command sent by the COP and that is sent to the COP by a snooper PE of the at least one snooper PE; and
the snooper PE is configured to:
predict, based on a repeat-read indicator of the plurality of repeat-read indicators, whether the write update protocol is preferred;
responsive to predicting that the write update protocol is preferred, assert the write-update-requested attribute of the snoop reply; and
responsive to predicting that the write update protocol is not preferred, deassert the write-update-requested attribute of the snoop reply.

11. The processor-based device of claim 1, wherein:
the COP is further configured to:
receive at least one snoop reply corresponding to the at least one snooper PE; and
determine whether any snoop reply of the at least one snoop reply comprises an asserted write-update-request attribute; and the COP is configured to send the response message to each of the master PE and the at least one snooper PE indicating the selected cache coherence protocol by being configured to:
  responsive to determining that any snoop reply of the at least one snoop reply comprises an asserted write-update-request attribute, send the response message to each of the master PE and the at least one snooper PE comprising an asserted write-update-valid attribute indicating that the write update protocol is selected for the memory store operation; and
  responsive to determining that no snoop reply of the at least one snoop reply comprises an asserted write-update-request attribute, send the response message to each of the master PE and the at least one snooper PE comprising a deasserted write-update-valid attribute indicating that the write invalidate protocol is selected for the memory store operation.

12. The processor-based device of claim 11, wherein:
  each snooper PE of the at least one snooper PE corresponding to a snoop reply of the at least one snoop reply comprising an asserted write-update-request attribute is configured to perform a write update operation responsive to the response message comprising an asserted write-update-valid attribute; and
  each snooper PE of the at least one snooper PE corresponding to a snoop reply of the at least one snoop reply comprising a deasserted write-update-request attribute is configured to perform a write invalidate operation responsive to the response message comprising an asserted write-update-valid attribute.

13. A method for dynamically selecting cache coherence protocols in processor-based devices, comprising:
  sending, by a master processing element (PE) of a plurality of PEs of a processor-based device, a cache coherence bus command to a central ordering point circuit (COP) as part of a memory store operation;
  generating, by a PE of the plurality of PEs, a first protocol preference indicator based on a repeat-read indicator of a plurality of repeat-read indicators of the PE, each repeat-read indicator of the plurality of repeat-read indicators corresponding to a coherence granule read by the PE and indicating whether the coherence granule was repeatedly read by the PE;
  sending the first protocol preference indicator to the COP;
  responsive to receiving the cache coherence bus command, dynamically selecting, by the COP on a store-by-store basis, one of a write invalidate protocol and a write update protocol as a cache coherence protocol to use for maintaining cache coherency, based on one or more protocol preference indicators provided by one or more of the master PE, at least one snooper PE among the plurality of PEs, and the COP, the one or more protocol preference indicators comprising the first protocol preference indicator; and
  sending, by the COP, a response message indicating the selected cache coherence protocol to each of the master PE and the at least one snooper PE.

14. The method of claim 13, further comprising:
  upon a first read of a coherence granule by the PE:
    allocating, by the PE, a corresponding cache line of a plurality of cache lines of a cache of the PE, wherein each cache line comprises a corresponding repeat-read indicator of the plurality of repeat-read indicators; and
    initializing, by the PE, the repeat-read indicator of the cache line to a value of zero (0); and
  upon determining that a locally executed read operation results in a hit on the cache line, incrementing, by the PE, the repeat-read indicator of the cache line.

15. The method of claim 14, wherein each repeat-read indicator of the plurality of repeat-read indicators comprises one or more bits.

16. The method of claim 14, further comprising:
  upon eviction of the cache line of the plurality of cache lines of the cache by the PE due to a snoop invalidation:
    allocating, by the PE, a snoop eviction table entry of a plurality of snoop eviction table entries of a snoop eviction table of the PE, wherein each snoop eviction table entry comprises:
      a coherence granule address;
      a previous-repeat-read indicator; and
      a valid indicator;
    initializing, by the PE, the coherence granule address of the snoop eviction table entry to an address of the coherence granule;
    initializing, by the PE, the previous-repeat-read indicator of the snoop eviction table entry to a value of the repeat-read indicator of the cache line; and
    initializing, by the PE, the valid indicator of the snoop eviction table entry to indicate that the snoop eviction table entry is valid; and
  upon determining, by the PE, that the locally executed read operation results in a miss on the cache but matches a valid snoop eviction table entry:
    incrementing, by the PE, the previous-repeat-read indicator of the valid snoop eviction table entry;
    allocating, by the PE, a new cache line corresponding to the locally executed read operation;
    initializing, by the PE, the repeat-read indicator of the new cache line to a value of the previous-repeat-read indicator of the valid snoop eviction table entry; and
    updating, by the PE, the valid indicator of the valid snoop eviction table entry to indicate that the valid snoop eviction table entry is not valid.

17. The method of claim 13, further comprising:
  upon eviction of a cache line of a plurality of cache lines of a cache by the PE due to a snoop invalidation:
    allocating, by the PE, a snoop eviction table entry of a plurality of snoop eviction table entries of a snoop eviction table of the PE, wherein each snoop eviction table entry comprises:
      a coherence granule address;
      a corresponding repeat-read indicator of the plurality of repeat-read indicators; and
      a valid indicator;
    initializing, by the PE, the coherence granule address of the snoop eviction table entry to an address of a coherence granule corresponding to the cache line;
    initializing, by the PE, the repeat-read indicator of the snoop eviction table to a value of zero (0); and
    initializing, by the PE, the valid indicator of the snoop eviction table entry to indicate that the snoop eviction table entry is valid; and
  upon determining, by the PE, that a read operation results in a miss on the cache but matches a valid snoop eviction table entry, incrementing, by the PE, the repeat-read indicator of the valid snoop eviction table entry.

18. The method of claim 17, wherein each repeat-read indicator of the plurality of repeat-read indicators comprises one (1) bit.

19. The method of claim 13, wherein the cache coherence bus command comprises one of a non-allocating-write bus command, a read-with-intent-to-write bus command, and a promote-to-writeable bus command.

20. The method of claim 13, wherein:
the one or more protocol preference indicators comprises a prevent-write-update attribute of the cache coherence bus command by the master PE; and
the method further comprises:
predicting, by the master PE based on a repeat-read indicator of the plurality of repeat-read indicators, that the write invalidate protocol is preferred; and
responsive to predicting that the write invalidate protocol is preferred, asserting, by the master PE, the prevent-write-update attribute of the cache coherence bus command.

21. The method of claim 20, wherein sending the response message to each of the master PE and the at least one snooper PE indicating the selected cache coherence protocol comprises, responsive to receiving the cache coherence bus command with the prevent-write-update attribute of the cache coherence bus command asserted, sending, by the COP, the response message to each of the master PE and the at least one snooper PE comprising a deasserted write-update-valid attribute indicating that the write invalidate protocol is selected for the memory store operation.

22. The method of claim 13, wherein:
the one or more protocol preference indicators comprises a write-update-requested attribute of a snoop reply that is associated with a snoop command sent by the COP and that is sent to the COP by a snooper PE of the at least one snooper PE; and
the method further comprises:
predicting, by the snooper PE based on a repeat-read indicator of the plurality of repeat-read indicators, that the write update protocol is preferred; and
responsive to predicting that the write update protocol is preferred, asserting, by the snooper PE, the write-update-requested attribute of the snoop reply.

23. The method of claim 13, further comprising:
receiving, by the COP, at least one snoop reply corresponding to the at least one snooper PE; and
determining, by the COP, that a snoop reply of the at least one snoop reply comprises an asserted write-update-request attribute;
wherein sending the response message to each of the master PE and the at least one snooper PE indicating the selected cache coherence protocol comprises, responsive to determining that the snoop reply of the at least one snoop reply comprises an asserted write-update-request attribute, sending, by the COP, the response message to each of the master PE and the at least one snooper PE comprising an asserted write-update-valid attribute indicating that the write update protocol is selected for the memory store operation.

24. A non-transitory computer-readable medium, having stored thereon computer-executable instructions that, when executed by a processor-based device, cause the processor-based device to:
send, by a master processing element (PE) of a plurality of PEs of the processor-based device, a cache coherence bus command to a central ordering point circuit (COP) as part of a memory store operation;
generate, by a PE of the plurality of PEs, a first protocol preference indicator based on a repeat-read indicator of a plurality of repeat-read indicators of the PE, each repeat-read indicator of the plurality of repeat-read indicators corresponding to a coherence granule read by the PE and indicating whether the coherence granule was repeatedly read by the PE;
send the first protocol preference indicator to the COP of the processor-based device;
responsive to receiving the cache coherence bus command, dynamically select, by the COP on a store-by-store basis, one of a write invalidate protocol and a write update protocol as a cache coherence protocol to use for maintaining cache coherency, based on one or more protocol preference indicators provided by one or more of the master PE, at least one snooper PE among the plurality of PEs, and the COP, the one or more protocol preference indicators comprising the first protocol preference indicator; and
send, by the COP, a response message indicating the selected cache coherence protocol to each of the master PE and the at least one snooper PE.

\* \* \* \* \*